(12) United States Patent
Wang et al.

(10) Patent No.: US 10,212,322 B2
(45) Date of Patent: Feb. 19, 2019

(54) CAMERA MODULE AND ELECTRIC HOLDER AND ASSEMBLING METHOD THEREOF

(71) Applicant: NINGBO SUNNY OPOTECH CO., LTD., Ningbo, Zhejiang (CN)

(72) Inventors: Mingzhu Wang, Ningbo (CN); Nan Guo, Ningbo (CN); Feifan Chen, Ningbo (CN); Bojie Zhao, Ningbo (CN); Bo Peng, Ningbo (CN); Zhen Huang, Ningbo (CN)

(73) Assignee: Ningbo Sunny Opotech Co., Ltd., Ningbo, Zhejiang (CN)

( * ) Notice: Subject to any disclaimer, the term of this patent is extended or adjusted under 35 U.S.C. 154(b) by 355 days.

(21) Appl. No.: 15/057,068

(22) Filed: Feb. 29, 2016

(65) Prior Publication Data

US 2017/0142305 A1    May 18, 2017

(30) Foreign Application Priority Data

Nov. 13, 2015 (CN) .......................... 2015 1 0778437
Nov. 16, 2015 (CN) .......................... 2015 1 0784845
Feb. 22, 2016 (CN) .......................... 2016 1 0096941

(51) Int. Cl.
    *H04N 5/225* (2006.01)
(52) U.S. Cl.
    CPC ......... *H04N 5/2257* (2013.01); *H04N 5/2253* (2013.01); *H04N 5/2254* (2013.01)

(58) Field of Classification Search
    CPC ......... H01L 27/146–27/14893; H04M 1/0264; G02B 13/001–13/009; H04N 5/2257
    USPC ...... 348/374, 340, 357; 396/520; 250/208.1; 257/225–234, 257, 258, 291–294, 257/431–448
    See application file for complete search history.

(56) References Cited

U.S. PATENT DOCUMENTS

| | | | |
|---|---|---|---|
| 2004/0095501 A1* | 5/2004 | Aizawa | H01L 27/14618 348/340 |
| 2005/0237418 A1* | 10/2005 | Sakamoto | G02B 7/026 348/340 |
| 2008/0252774 A1* | 10/2008 | Chen | H04N 5/2254 348/374 |
| 2011/0221956 A1* | 9/2011 | Sekine | H04N 5/2253 348/374 |
| 2012/0212664 A1* | 8/2012 | Hou | H04N 5/2257 348/374 |

* cited by examiner

*Primary Examiner* — Xi Wang
(74) *Attorney, Agent, or Firm* — Raymond Y. Chan; David and Raymond Patent Firm

(57) ABSTRACT

A camera module includes a lens, a photosensitive chip and an electrical holder. The electrical holder has an integrated circuit that the electrical holder serves as an integration of a base and a PCB in a conventional camera module, wherein the electrical holder not only forms an assembling unit for connecting a driver and an optical lens but also forms an electrical connection unit for electrically connecting to the driver, a photosensitive chip and a flexible circuit board with each other, so as to minimize an overall size of the camera module.

3 Claims, 11 Drawing Sheets

Conduction Method of Camera Module

S1: Arranging a circuit arrangement at a main body to form an electrical holder Conduction Method of Camera Module S2: Electrically connecting a photosensitive chip at the electrical holder S3: Electrically connecting a flexible circuit board with the electrical holder S4: Electrically connecting a motor at the electrical holder S5: Electrically connecting with an electronic equipment to input control signals

FIG. 11

CAMERA MODULE AND ELECTRIC HOLDER AND ASSEMBLING METHOD THEREOF

CROSS REFERENCE OF RELATED APPLICATION

This is a non-provisional application that claims priority to a first Chinese application number CN 201510778437.2, filing date Nov. 13, 2015, a second Chinese application number CN 201510784845.9, filing date Nov. 16, 2015, and a third Chinese application number CN 201610096941.9, filing date Feb. 22, 2016, the entire contents of each of which are expressly incorporated herein by reference.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to camera modules, and more particularly to a camera module, an electric holder and an assembling method thereof.

Description of Related Arts

With the rapid development of electronic products, the electronic products become a vital product in people daily lives. In order to achieve the market demands of space-saving and portability, the electronic products are designed to have a tendency toward lightness and thinness, such that the size of each electronic component must be minimized. Therefore, the size of the camera module must also be minimized with lightness and thinness features correspondingly to be installed into the electronic product.

Camera module structure in the traditional COB (chip on board) manufacturing process comprises a printed circuit board, a photosensitive chip, a lens base, a driver driver, and a lens assembly, wherein each of the electronic components of the camera module structure are arranged on a surface of the circuit board, wherein the electronic components are not overlapped with each other. Based on the high requirement of pixel and extra-thin structure of the camera module, the image quality for the camera module is highly expected. Therefore, the packaging and assembling process of the camera module will be complicated and the specification of each electronic component will be relatively high. At the same time, for higher pixel of the camera module, the chip area thereof becomes relatively bigger. The number of electronic components, such as the driver driver, resistors, and capacitors, will be increased. As a result, the overall size of the camera module will be relatively enlarged.

Existing mobile phone module package is conflict with the trend of phone camera module with its thinness and miniaturization features, it is necessary to invent a new type of compact packaging technology to meet the demands of product development.

Although such camera module has been widely used in the market, this camera module still has many drawbacks.

Firstly, during the manufacturing process for the camera module, after the camera module is assembled, the driver of the camera module need to be soldered to the circuit board to ensure the driver to be electrically connected. As a result, the manufacturing process is complicated. The soldering step will also causes other problems. For example, the product quality might be influenced by the soldering quality. Moreover, this soldering connection by soldering the protruded conductor is not solid, which would be easily damaged during operation or maintenance process.

Secondly, since the base is provided between the driver, the electrical connection between the circuit and the driver must be extended through the base, so as to take up space and weaken the engagement between the circuit and the driver.

Furthermore, through the conventional manufacturing process, the connecting wires for externally connecting between the circuit and the driver are vulnerable to external environment, such as the dust, etc., so as to affect the quality of the entire camera module and to reduce the service life of the entire camera module.

Furthermore, in order to provide a better supporting function of the base, the size of the base must be enlarged to provide a larger supporting area. Therefore, the overall size of the camera module will become larger as well. If the size of the camera module is reduced by reducing the size of the base, the supporting function of the base will be affected.

Furthermore, the circuit board of the conventional camera module is mounted on a bottom portion of the camera module, wherein the energy consuming components, such as the driver and the photosensitive chip, are arranged in a relatively far distance from the circuit board. In other words, more wires are required to be used in the camera module for electrical connection, and the design of the circuit configuration for the electrical components is more complicated. As a result, the occupying space of the circuit cannot be reasonably utilized. That is to say, if the circuit configuration and the electrical components are reasonably re-designed, the occupying space of the circuit can be effectively minimized. Then, the dimension of the camera module can be further minimized. Of course, the dimension, such as the width or thickness, of the camera module can be selectively adjusted in order to satisfy the market demands.

SUMMARY OF THE PRESENT INVENTION

The invention is advantageous in that it provides a camera module, an electrical holder, an assembling method and a connecting method thereof, wherein the camera module does not contain any conventional base structure.

Another advantage of the invention is to provide a camera module, an electrical holder, an assembling method and a connecting method thereof, wherein the electrical holder integrates with the circuit board and the base to replace the base of the conventional camera module.

Another advantage of the invention is to provide a camera module, an electrical holder, an assembling method and a connecting method thereof, wherein the electrical holder is arranged to electrically connect with the electronic components of the camera module, such as, the chip, the driver and the like.

Another advantage of the invention is to provide a camera module, an electrical holder, an assembling method and a connecting method thereof, wherein the electrical holder can also support the optical filter of the camera module.

Another advantage of the invention is to provide a camera module, an electrical holder, an assembling method and a connecting method thereof, wherein the electrical holder can also support the driver of the camera module.

Another advantage of the invention is to provide a camera module, an electrical holder, an assembling method and a connecting method thereof, wherein the shape of the electrical holder is selectively configured according to different electronic components of the camera module.

Another advantage of the invention is to provide a camera module, an electrical holder, an assembling method and a connecting method thereof, wherein the electrical holder is formed with a compact structure to minimize the size of the camera module.

Another advantage of the invention is to provide a camera module, an electrical holder, an assembling method and a connecting method thereof, wherein the electrical conductors and the electrical elements are pre-set at the main body of the electrical holder to form a circuit arrangement, such that the circuit arrangement is built-in with the electrical holder.

Another advantage of the invention is to provide a camera module, an electrical holder, an assembling method and a connecting method thereof, wherein the thickness of the electrical holder is minimized to fit in the camera module so as to make the electronic products be thinner and lighter.

Another advantage of the invention is to provide a camera module, an electrical holder, an assembling method and a connecting method thereof, wherein the structure and the shape of the electrical holder is specifically configured for fitting different components of the camera module to minimize the size of the entire camera module.

Another advantage of the invention is to provide a camera module, an electrical holder, an assembling method and a connecting method thereof, wherein the size of the camera module is minimized with lightness and thinness.

Another advantage of the invention is to provide a camera module, an electrical holder, an assembling method and a connecting method thereof, wherein the camera module has no lens base structure and the cost thereof is reduced.

Another advantage of the invention is to provide a camera module, an electrical holder, an assembling method and a connecting method thereof, wherein the circuit arrangement of the camera module is embedded in the main body of the electrical holder to omit the circuit board attachment in the manufacturing process for the camera module, so as to simplify the process step and save the assembling cost.

Another advantage of the invention is to provide a camera module, an electrical holder, an assembling method and a connecting method thereof, wherein the camera module has a solid structure.

Another advantage of the invention is to provide a camera module, an electrical holder, an assembling method and a connecting method thereof, wherein the resistance, capacitance and driver chip device of the camera module are embedded in the electrical holder to prevent the camera module being contaminated by the soldering resist and dust or being shorted by solder, water and other contaminants and to improve the yield of product.

Another advantage of the invention is to provide a camera module, an electrical holder, an assembling method and a connecting method thereof, which can increase market competitiveness of the electronic product employing the camera module, especially increase its competitiveness in the high-end market and the market competitiveness of the corresponding electronic products.

Additional advantages and features of the invention will become apparent from the description which follows, and may be realized by means of the instrumentalities and combinations particular point out in the appended claims.

According to the present invention, the foregoing and other objects and advantages are attained by an electrical holder. The electrical holder is used as one of the components of a camera module. The electrical holder comprises a main body and a circuit arrangement. The circuit arrangement is provided at the main body. The circuit arrangement is electrically connected with a photosensitive chip. The photosensitive chip is provided at and supported by an inner side of the electrical holder.

In one embodiment, the electrical holder comprises a plurality of connecting elements, wherein the connecting elements are electrically connected with the circuit arrangement.

In one embodiment, the main body has a step-stair configuration.

In one embodiment, the circuit comprises a plurality of electrical elements and a plurality of electrical conductors, wherein the electrical conductors are electrically connected with the electrical elements, wherein the electrical elements are embedded in the main body.

In one embodiment, the electrical holder has a through hole, wherein the photosensitive chip is provided in the through hole. Alternatively, the electrical holder has an indented groove, wherein the photosensitive chip is installed in the indented groove.

In one embodiment, each of the electronic components is selected from the group including resistance, capacitance, transistor, converter, diode, driver chip, and etc.

In one embodiment, the electrical holder further comprises a plurality of electronic components provided on a surface thereof in a protruding manner, wherein each of the electronic components is selected from the group including resistances, capacitances, transistor, converter, diode, drive chips, and etc.

In one embodiment, the camera module is a fixed-focus camera module, wherein the electrical holder further comprises a lens supporter supported at a first supporting portion of the electrical holder to receive an optical lens of the camera module, wherein the circuit arrangement is embedded in the main body and is further extended to be embedded in the lens supporter.

In one embodiment, the camera module is a zoom camera module having a driver such as zoom driver.

In one embodiment, the connecting elements comprises a plurality of chip connectors for electrically connecting the photosensitive chip with the circuit arrangement, wherein the electric connection method between the photosensitive chip and the circuit arrangement is selected from the group including soldering, anisotropic conductive paste, ultra sonic press, UV exposure, X-ray exposure, conductive glue, hot pressing, and etc In one embodiment, the connecting elements comprises a plurality of board connectors for electrically connecting the flexible circuit board of the camera module with the circuit of the camera module, wherein the electric connection method between the flexible circuit board and the circuit is selected from the group including soldering, anisotropic conductive paste, ultra sonic press, UV exposure, X-ray exposure, conductive glue, hot pressing, and etc.

In one embodiment, the connecting elements comprises a plurality of different connectors for electrically connecting different electronic components of the camera module with the circuit arrangement, wherein the electric connection method between the flexible circuit board and the circuit arrangement is selected from the group including soldering, anisotropic conductive paste, ultra sonic press, UV exposure, X-ray exposure, conductive glue, hot pressing, and etc.

In one embodiment, the circuit arrangement is embedded in the lens supporter and the main body, wherein the electric connection method between the lens supporter and the main body is selected from the group including soldering, anisotropic conductive paste, ultra sonic press, UV exposure, X-ray exposure, conductive glue, hot pressing, and etc.

In one embodiment, each of the connecting elements can be embodied as a bonding pad or a pin.

In one embodiment, the main body of the electrical holder comprises a first supporting portion and a second supporting portion, wherein an inner side of the first supporting portion and the top side of the second supporting portion form a first indented groove, and the second supporting portion has a second indented groove.

In one embodiment, the chip connectors of the camera module are provided an inner surface of the second supporting portion.

In one embodiment, the main body of the electrical holder further comprises a third supporting portion, wherein the third supporting portion is inwardly indented corresponding to the second supporting portion, wherein the chip connectors connected with the photosensitive chip are provided on a top side of the third supporting portion.

In one embodiment, an inner side of the second supporting portion has a second indented groove, wherein the photosensitive chip is provided at the second indented groove.

In another embodiment, the main body further comprises a third supporting portion, wherein the third supporting portion is inwardly indented corresponding to the second supporting portion, wherein a top side of the third supporting portion forms a second indented groove, and an inner side of the third supporting portion forms a third indented groove, wherein the first indented groove, the second indented groove and the third indented groove form a through hole.

In one embodiment, the main body further comprises a third supporting portion, wherein a top side of the third supporting portion forms a second indented groove, and the third supporting portion forms a base of the electrical holder, wherein the first indented groove and the second indented groove form an integrated groove, wherein the third supporting portion forms a base and has a bottom serving as a bottom of the integrated groove.

In one embodiment, the chip connectors of the camera module are provided on an inner surface of the second supporting portion or the top side of the third supporting portion.

In one embodiment, the photosensitive chip is connected to at least one lead by COB type to be connected electrically with the connecting elements of the electrical holder, wherein the lead may be a gold wire, a copper wire, an aluminum wire, a silver wire, or an alloy wire having any material mentioned above.

In accordance with another aspect of the invention, the present invention further provides a camera module. The camera module is a fixed focus camera module, auto-focus camera module or zoom camera module to incorporate with the electrical holder.

In accordance with another aspect of the invention, the present invention further provides an assembling method for a camera module, which comprising the steps of:

providing a photosensitive chip at an inner side of the electrical holder and positioning an optical lens along a photosensitive path of the photosensitive chip; and electrically coupling the photosensitive chip with the electrical holder.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 11 is a flow chart illustrating a manufacturing method for the camera module according to the preferred embodiment of the present invention.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
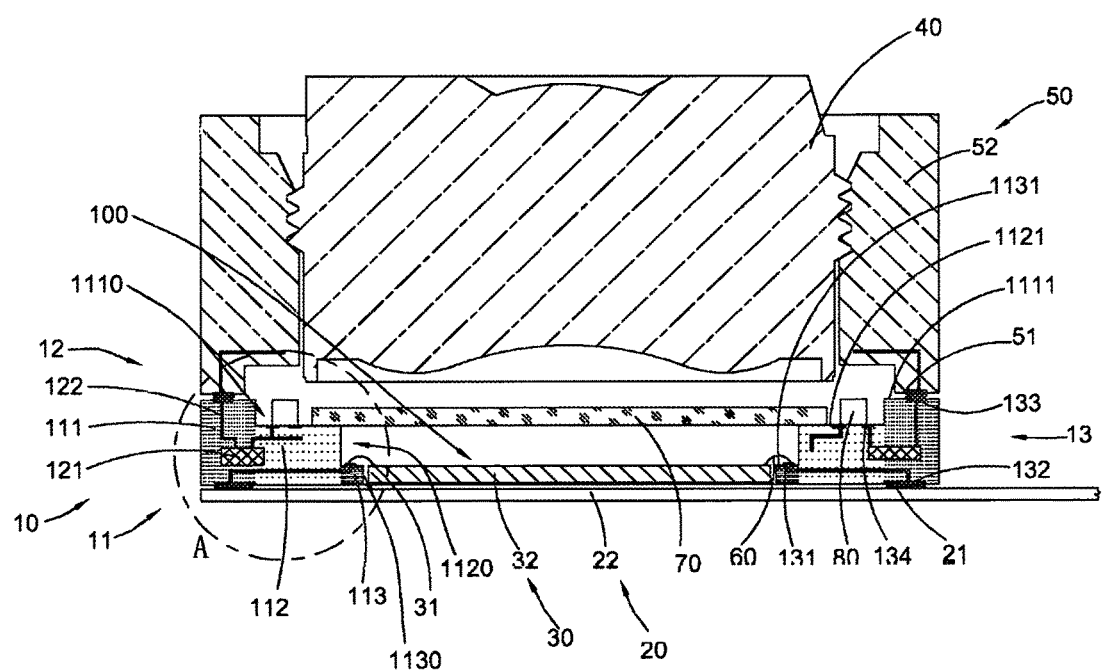
FIG. 1 is a sectional view of a camera module according to the first preferred embodiment of the present invention.
Figure 3:
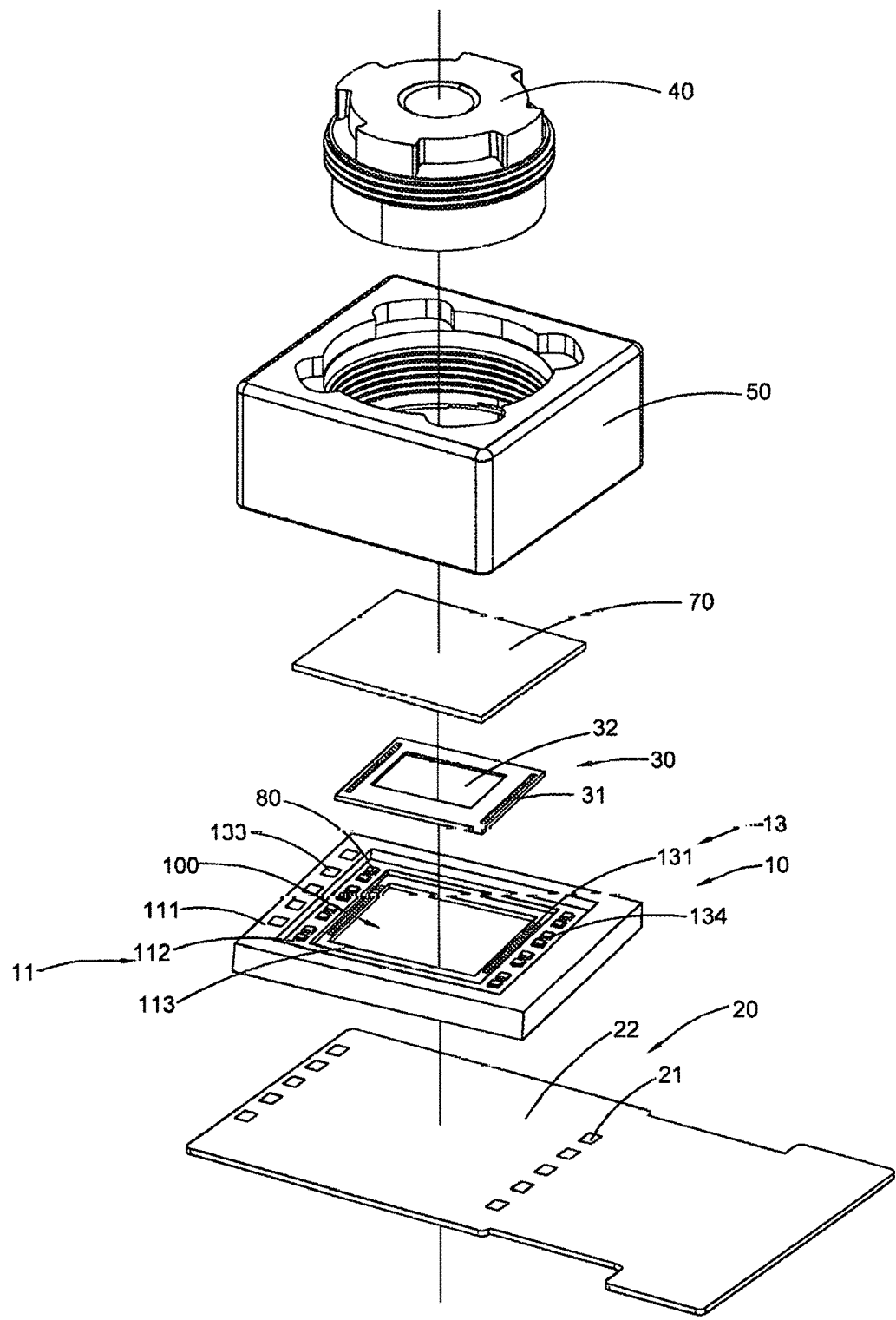
FIG. 3 is an exploded perspective view of the camera module according to the first preferred embodiment of the present invention.

As shown in FIGS. 1 and 3, a camera module according to a first preferred embodiment of the present invention is illustrated, wherein the camera module comprises an electrical holder 10, a flexible circuit board 20, a photosensitive sensor 30 such as a photosensitive chip, an optical lens 40, and a driver 50 such as a motor.

The optical lens 40 is operatively coupled at the driver 50, and the optical lens 40 can be actuated by the driver 50 to form an auto-focusing mechanism. The flexible circuit board 20 and the driver 50 are provided at two different sides of the electrical holder 10 to locate the optical lens 40 along a photosensitive path of the photosensitive chip 30. When the camera module is operated for capturing image, the light reflected by the object can be further accepted by the photosensitive chip 30 for photoelectric conversion after passing through the optical lens 40. That is to say, the flexible circuit board 20 and the driver 50 are connected with each other by the electrical holder 10. In other words, the electrical holder 10 serves as an integration of a base and a PCB in a conventional camera module, wherein the electrical holder 10 forms an assembling means for connecting the driver 50 and the optical lens 40 and forms an electrical connection means for electrically connecting to the driver 50, the photosensitive chip 30 and the flexible circuit board 20 with each other.

The electrical holder 10 comprises a main body 11, a circuit arrangement 12, a plurality of connecting elements 13, and a through hole 100. The circuit arrangement 12 is embedded in the main body 11, wherein the connecting elements 13 are provided on a surface of the main body 11. The circuit arrangement 12 comprises a plurality of electrical elements 121 and a plurality of electrical conductors 122, wherein the electrical conductors 122 are electrically connected with the electrical elements 121 in a predetermined manner. In addition, the electrical conductors 122 are electrically connected to the driver 50, the flexible circuit board 20 and the photosensitive chip 30 via the connecting elements 13, so as to pre-form a camera circuit of the camera module for activating and adjusting of the camera module. Each of the electrical elements 121 can be one of the resistances, capacitances and driver chips, and the like.

As shown in FIGS. 1 and 3, according to the first preferred embodiment of the present invention, the main body 11 comprises a first supporting portion 111, a second supporting portion 112 and a third supporting portion 113, wherein the first supporting portion 111 forms an outer annular ring body. The second supporting portion 112 is integrated with an inner side of the first supporting portion 111, wherein the third supporting portion 113 is integrated with an inner side of the second supporting portion 112, such that the second supporting portion 112 defines a middle ring body between the first supporting portion 111 and the third supporting portion 113. The through hole 100 is formed at the third supporting portion 113, wherein the third supporting portion 113 forms an inner annular ring body. It is worth mentioning that the three supporting portions 111, 112 and 113 form a step-stair configuration to define a three-step structure, which is exemplary only and not intended to be limiting the present invention. For example, in some embodiments, the three supporting portions 111, 112 and 113 may not have the step-stair configuration, or may have the step-stair configuration with a two-step structure. The first supporting portion 111, the second supporting portion 112 and the third supporting portion 113 can be integrated with each other by a stacking process as an example, such as by configuring a laminated resin on a stiffening steel or copper plate to form the main body 11, and by arranging the circuit arrangement 12 to be embedded in the main body 11 to pre-form internal electrical lines thereat. The first supporting portion 111 has a first top surface 1111. The second supporting portion 112 has a second top surface 1121. The third supporting portion 113 has a third top surface 1131. The second top surface 1121 is inwardly indented corresponding to the first top surface 1111 to define a first indented groove 1110. The third top surface 1131 is inwardly indented corresponding to the second top surface 1121 to define a second indented groove 1120 and a third indented groove 1130 is formed on the inner side of the third supporting portion 113. In other words, the through hole 100 is defined by the first indented groove 1110, the second indented groove 1120 and the third indented groove 1130. In this exemplary preferred embodiment, the three supporting portions 111, 112 and 113 define the top surface with three steps structure. The main body 11 of the electrical holder 10 of the camera module according to the first preferred embodiment has the three-step configuration, such that main body 11 not only provides a securely supporting structure to support the driver 50 and the optical lens 40 by the first supporting portion 111 but also fully utilities the installation space for other camera components of the camera module.

For example, according to the first preferred embodiment, the camera module further comprises an optical filter 70 and a plurality of electronic components 80, wherein the optical filter 70 is used for filtering useless light to improve the image's quality. The optical filter 70 and the electronic components 80 are supportively supported on the second top surface 1121 of the second supporting portion 112, such that the first indented groove 1110 can provide an arrangement space for the optical filter 70 and the electronic components 80. Each of the electronic components can be a resistance, capacitance or driver chip and the like. It is worth mentioning that the electronic components 80 may be provided at other positions. In this aspect, the present invention is not limited. The optical filter 70 can be embodied as but not be limited to an IR filter or an infrared cut-off filter (IRCF).

The photosensitive chip 30 is located corresponding to the through hole 100. According to the first preferred embodiment of the present invention, the photosensitive chip 30 is provided in the third indented groove 1130 and is enclosed by the third supporting portion 113 to fully utilize the space of the through hole 100. Furthermore, the photosensitive chip 30 may be further extended into the second indented groove 1120. It is worth mentioning that the setting location of the photosensitive chip 30 is exemplary only and not intended to be limiting the present invention. According to other embodiment of the present invention, the photosensitive chip 30 may be provided at other positions, for example, a top side of the third top surface 1131 of the third supporting portion 113.

The photosensitive chip 30 is electrically connected to the electrical holder 10. Specifically, the photosensitive chip 30 comprises a plurality of photosensitive chip conductive elements 31 and a chip body 32, wherein the photosensitive chip conductive elements 31 are provided at the chip body 32. The connecting elements 13 of the electrical holder 10 comprises a plurality of chip connectors 131, wherein the photosensitive chip conductive elements 31 are electrically connected with the corresponding chip connectors 131 to achieve the electrical conduction and electrification between the photosensitive chip 30 and the electrical holder 10. According to the first preferred embodiment of the present invention, each of the photosensitive chip conductive elements 31 can be electrically connected with the corresponding chip connector 131 by traditional COB type. In other words, the photosensitive chip 30 is connected with a lead wire 60 (alternatively, a gold, copper, aluminum, or silver wire or alloy of any metal mentioned above) by traditional COB type to be electrically connected with the chip connectors 131 of the electrical holder 10. According to the first preferred embodiment of the present invention, the chip connectors 131 may be embodied as but not be limited to a pin or bonding pad. In other words, the photosensitive chip 30 can be electrically connected with the electrical holder 10 by fully utilizing the existing technology to reduce the cost of the technical improvement, making full use of the traditional process and equipment to minimize a waste of resources. It is appreciated by one skilled in the art that the electrical connection between the photosensitive chip 30 and the electrical holder 10 can be achieved by any other electronic connection mode, which can accomplish the objects of the present invention. In this aspect, the present invention is not limited. In addition, the photosensitive chip 30 is further connected and coupled on the flexible circuit board 20 such that the photosensitive chip 30 is supported by the flexible circuit board 20.

According to the first preferred embodiment of the present invention, the second indented groove 1120 provides enough space of wire configuration and protection for the lead 60, and the third supporting portion 113 ensures the electrical connection of the photosensitive chip 30 and the electrical holder 10 to be more secured.

According to the first preferred embodiment of the present invention, the holder body 11 has the step-stair configuration, which can be used for receiving components, for example, carrying an IRCF or lens thereon.

It is appreciated by one skilled in the art that the structure that the main body 11 comprises the first supporting portion 111, the second supporting portion 112 and the third supporting portion 113 is exemplary only and not intended to be limiting the present invention. According to other embodiments of the present invention, the main body 11 may be provided to define a double-step shape, multiple-step shape or non-step shape. In this aspect, the present invention should not be limited. The shape of the main body 11 can be adjusted corresponding to the required.

Figure 2:
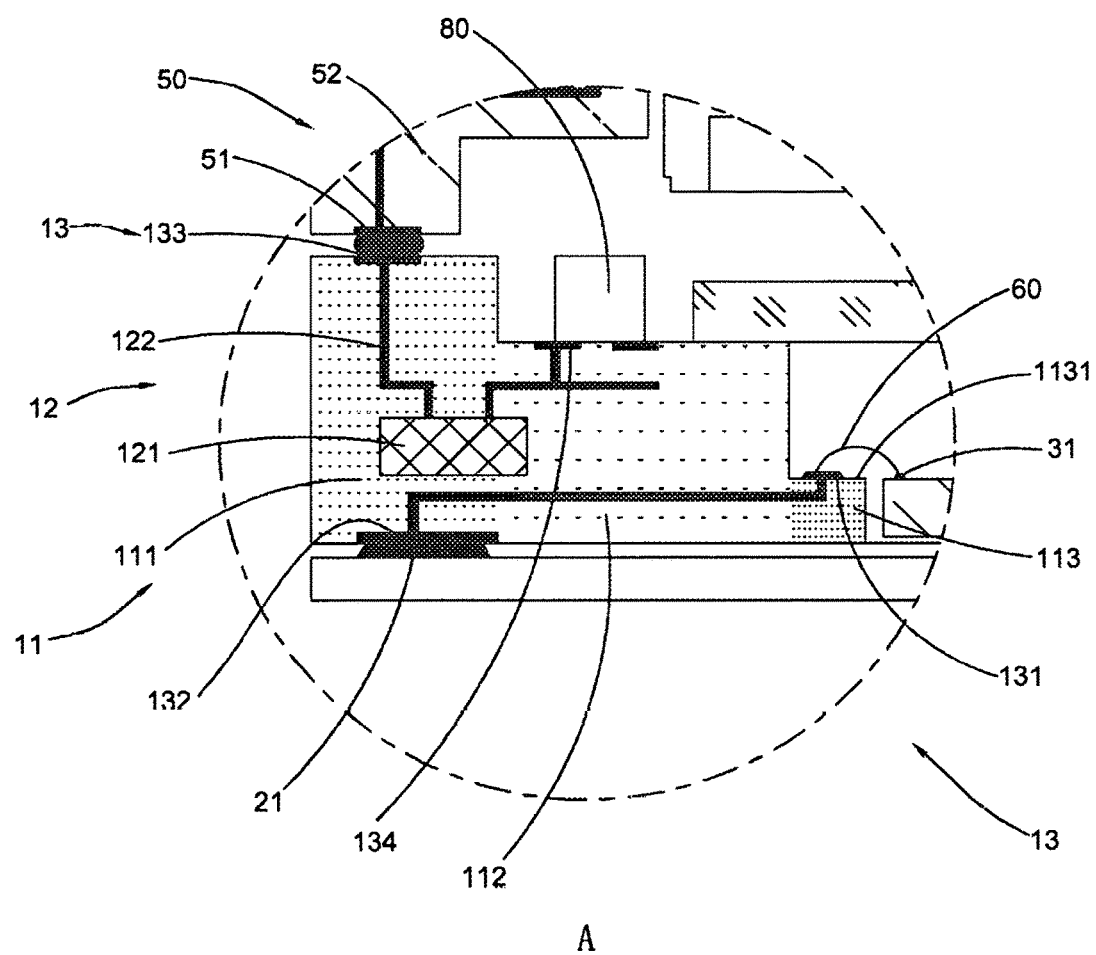
FIG. 2 is a partially enlarged sectional view of the camera module according to the first preferred embodiment of the present invention.

As shown in FIGS. 1 and 2, the electrical holder 10 is electrically connected with the flexible circuit board 20. Specifically, the connecting elements 13 of the electronic 10 further comprise a plurality of board connectors 132. The flexible circuit board 20 comprises a plurality of PCB conductive elements 21 and a board body 22, wherein the PCB conductive elements 21 are provided at the board body 22. The PCB conductive elements 21 are electrically connected with the corresponding board connectors 132 so as to electrically connect the flexible circuit board 20 with the electrical holder 10, Therefore, the electrical holder 10 can be electrically connected to a circuit board of an electrical equipment.

According to the first preferred embodiment of the present invention, the electrical holder 10 is coupled to the flexible circuit board 20 to electrically connect the flexible circuit board 20 with the electrical holder 10. It is worth mentioning that the PCB conductive elements 21 are provided on the board body 22 are located corresponding to the location of the board connectors 132 provided on the electrical holder 10 so as to enable the flexible circuit board 20 be electrically connected with the circuit arrangement 12. The PCB conductive elements 21 are electrically connected with the board connectors 132 provided on the electrical holder 10, wherein the electric connection may be embodied but not be limited to soldering connection.

According to the first preferred embodiment of the present invention, each of the board connectors 132 can be embodied as but not be limited to a pin or bonding pad. The electrical holder 10 is electrically connected with the flexible circuit board 20 by soldering. It is appreciated to one skilled in the art that the attaching connection type or welding connection type are exemplary only and not intended to be limiting the present invention. The connection between the electrical holder 10 and the flexible circuit board 20 may be embodied as but not be limited to soldering structure.

The connecting elements 13 of the electrical holder 10 further comprise a plurality of driver connectors 133 and a plurality of component connectors 134, wherein the driver connectors 133 are provided on the top surface 1111 of the first supporting portion 111. According to the first preferred embodiment of the present invention, each of the driver connectors 133 can be embodied but not be limited to a pin or bonding pad. The driver bonding pad is used for electrically connecting the driver 50 with the circuit arrangement 12 to enable the driver 50 be actuated so as to drive the optical lens 40 such that the camera module is adjusted.

The driver 50 comprises a plurality of driver conductive elements 51 and a driver body 52, wherein the driver conductive elements 51 are provided at the driver body 52. It is worth mentioning that the driver conductive elements 51 are provided on the driver body 52 and are located corresponding to the locations of the driver connectors 133 provided on the electrical holder 10 such that when the driver 50 is coupled at the electrical holder 10, the driver 50 can be electrically connected with the circuit arrangement 12 and electrically connected with the flexible circuit board 20. More specifically, the driver conductive elements 51 are electrically connected with the driver connectors 133 of the electrical holder 10, the electrical connection method thereof can be but not be limited to anisotropic conductive paste (ACP), ultrasonic welding, thermal compression welding and reflow soldering.

According to the first preferred embodiment of the present invention, the component connectors 134 are provided on the second top surface 1121 of the second supporting portion 112. The component connectors 134 can be embodied as pins or bonding pads, which can be used for electrically connecting the electric components 80. It is appreciated to one skilled in the art that the component connectors 134 is not limited to pins and bonding pads. The electric connection between the electric components 80 and the electrical holder 10 can be embodied but not be limited to welding.

It is worth mentioning that the flexible circuit board 20 and the electrical holder 10 are two individual components, wherein the configurations of the flexible circuit board 20 and the electrical holder 10 are exemplary only but not to be limiting the present invention. According to other embodiments of the present invention, the flexible circuit board 20 may be integrated with the electrical holder 10. In addition, the shapes of the flexible circuit board 20 and the electrical holder 10 can be configured, respectively or integrally, as required.

It is appreciated to one skilled in the art that that the mentioned above connecting elements 13 and the assignment mode thereof are exemplary only but not to be limiting the present invention. Any alternative mode accomplishing the object of the present invention should be within the scope of the present invention.

The present invention further provides an assembling method of the camera module. In one embodiment, the camera module is manufactured by coupling the photosensitive chip 30 at the inner side of the electrical holder 10 and locating the optical lens 40 along the photosensitive path of the photosensitive chip 30 that the photosensitive chip 30 is electrically connected with the electrical holder 10. The electrical elements 121 and the electrical conductors 122 are embedded in the main body 11 of the electrical holder 10 to form the circuit arrangement 12 embedded therein. The connecting elements 13 are formed on the surface of the main body 11 to facilitate the electrical conduction of the camera module. The main body 11 is formed by arranging a resin or other thermal melting material on a reinforcing steel or copper panel to form the first supporting portion 111, the second supporting portion 112, the third supporting portion 113 and the through hole 100 so as to configure the main body 11 with the step-stair structure. The photosensitive chip 30 is provided in the through hole 100 at the inner side of the electrical holder 10.

The board connectors 132 are provided on the surface of the main body 11, and the flexible circuit board 20 is provided on the electrical holder 10, wherein the flexible circuit board 20 is electrically connected to the circuit arrangement 12 via the board connectors 132. The connection method for electrically connecting the flexible circuit board 20 on the electrical holder 10 and for electrically connecting the flexible circuit board 20 with the circuit arrangement 12 is selected from the group including welding, anisotropic conductive paste, ultra sonic press, UV exposure, X-ray exposure, conductive glue, hot pressing, and etc.

The driver connectors 133 are formed on the surface of the main body 11 and the optical lens 40 is provided on the driver 50 to form a zoom or auto-focus camera module. The driver 50 is provided on the electrical holder 10 by electrically connecting the driver 50 with the circuit arrangement 12 via the driver connectors 133. The connection method for coupling the driver 50 on the electrical holder 10 and for electrically connecting the driver 50 with the circuit arrangement 12 is selected from the group including soldering, anisotropic conductive paste, ultra sonic press, UV exposure, X-ray exposure, conductive glue, hot pressing, and etc.

The component connectors 134 are formed on the surface of the main body 11, wherein the electronic components 80 are provided on the main body 11 and are electrically connected with the circuit arrangement 12 via the component connectors 134. The connection method for electrically coupling the electronic components 80 on the electrical holder 10 is preferably by a soldering method. Each of the electronic components 80 can be a resistance, capacitance, transistor, converter, diode, driver chip, and etc.

The photosensitive chip 30 is formed by extending a lead therefrom by the traditional COB, in order to electrically connect with the chip connectors 131 of the electrical holder 10. According to the first preferred embodiment of the present invention, each of the chip connectors 131 can be embodied as but not be limited to a pin or bonding pad. As shown in FIGS. 1 to 3, the chip connectors 131 can be provided on the top surface of the third supporting portion 113.

Figure 4:
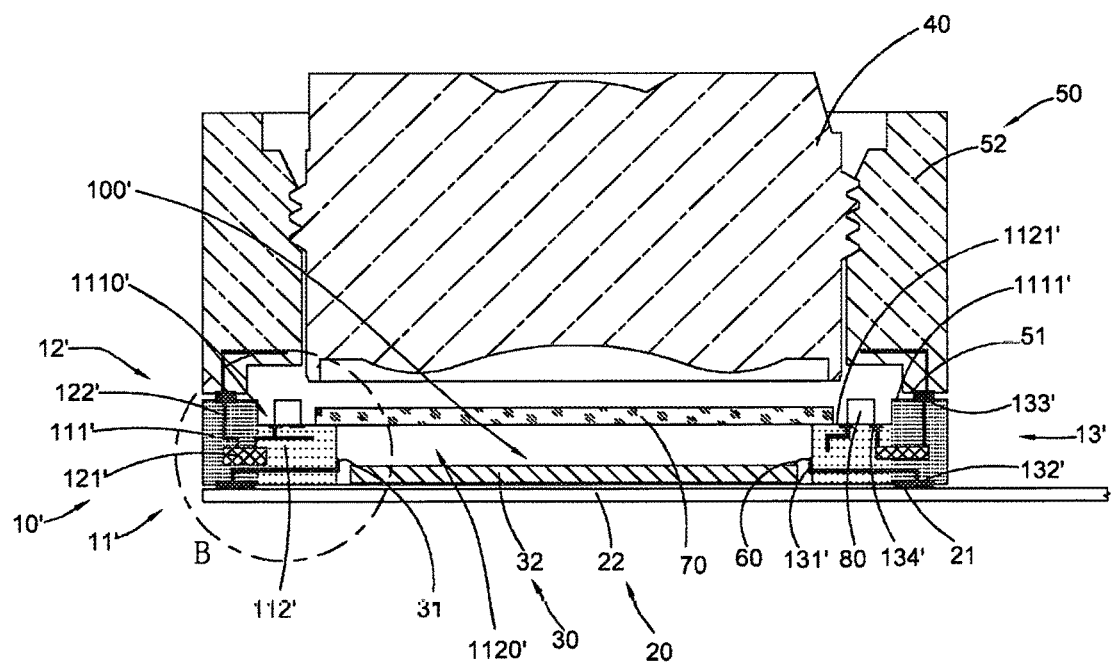
FIG. 4 is a sectional view of an alternative mode of the camera module according to the first preferred embodiment of the present invention.
Figure 5:
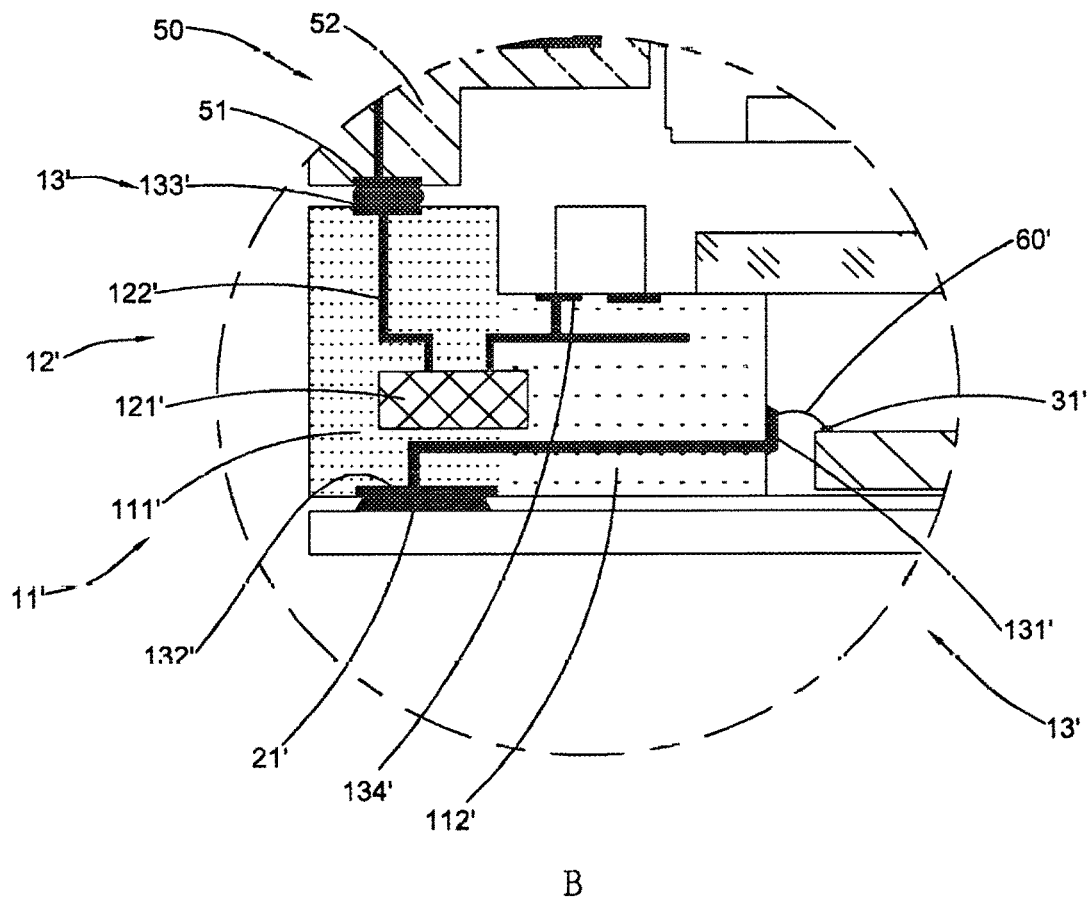
FIG. 5 is a partially enlarged sectional view of the alternative mode of the camera module according to the first preferred embodiment of the present invention.

FIGS. 4 and 5 illustrate an alternative mode of a camera module according to the first preferred embodiment of the present invention. The camera module comprises an electrical holder 10', a flexible circuit board 20, a photosensitive chip 30, an optical lens 40 and a driver 50.

The optical lens 40 is operatively coupled at the driver 50, and the optical lens 40 can be actuated by the driver 50 to form an auto-focusing or zoom mechanism. The flexible circuit board 20 and the driver 50 are provided at two different sides of the electrical holder 10' so as to locate the optical lens along the photosensitive path of the photosensitive chip 30. When the camera module is operated for capturing image, the light reflected by the object can be further accepted by the photosensitive chip 30 for photoelectric conversion after passing through the optical lens 40. That is to say, the flexible circuit board 20 and the driver 50 are connected with each other by the electrical holder 10. In other words, the electrical holder 10 serves as an integration of a base and a PCB in a conventional camera module, wherein the electrical holder 10' forms an assembling means for connecting the driver 50 and the optical lens 40 and forms an electrical connection means for electrically connecting to the driver 50, the photosensitive chip 30 and the flexible circuit board 20 with each other.

As shown in FIGS. 4 and 5, the electrical holder 10' comprises a main body 11', a circuit arrangement 12', a plurality of connecting elements 13' and a through hole 100'. The circuit arrangement 12' is embedded in the main body 11', wherein the connecting elements 13' are provided on a surface of the main body 11'. The circuit arrangement 12' comprises a plurality of electrical elements 121' and a plurality of electrical conductors 122', wherein the electrical conductors 122' are electrically connected with the electrical elements 121' in a predetermined manner. In addition, the electrical conductors 122' are electrically connected to the driver 50', the flexible circuit board 20' and the photosensitive chip 30' via the connecting elements 13', so as to pre-form a camera circuit of the camera module for activating and adjusting of the camera module.

As shown in FIGS. 4 and 5, according to the alternative mode of the first preferred embodiment of the present invention, the main body 11' comprises a first supporting portion 111' and a second supporting portion 112', wherein the first supporting portion 111' forms an outer annular ring body. The second supporting portion 112' is integrated with an inner side of the first supporting portion 111'. The second supporting portion 112' form an inner annular ring body. The first supporting portion 111' has a first top surface 1111'. The second supporting portion 112' has a second top surface 1121'. The second top surface 1121' is inwardly indented corresponding to the first top surface 1111' to define a first indented groove 1110'. The main body 11' of the electrical holder 10' of the camera module of the alternative mode according to the first preferred embodiment has a step-stair configuration such that the main body 11' not only provides a securely supporting structure to support to the driver 50 and the optical lens 40 by the first supporting portion 111', but also fully utilizes the installation space for other camera components of the camera module. For example, according to the alternative mode of the first preferred embodiment, the camera module further comprises an optical filter 70 and a plurality of electronic components 80, wherein the optical filter 70 is used for filtering useless light to improve the image's quality. The optical filter 70 and the electronic components 80 are provided on the second top surface 1121' of the second supporting portion 112' such that the first indented groove 1110' can provide an arrangement space for the optical filter 70 and the electronic components 80.

The photosensitive chip 30 is located corresponding to the through hole 100'. According to the alternative mode of the first preferred embodiment of the present invention, the photosensitive chip 30 is provided in the through hole 100' and is enclosed by the second supporting portion 112' to fully utilize the space of the through hole 100'. It is worth mentioning that, in this alternative, the above mentioned third supporting portion 113 is omitted in the electrical holder 10'. The photosensitive chip 30 is electrically connected with the inner side of the second supporting portion 112'.

The photosensitive chip 30 is electrically connected to the electrical holder 10'. Specifically, the photosensitive chip 30 comprises a plurality of photosensitive chip conductive elements 31 and a chip body 32, wherein the photosensitive chip conductive elements 31 are provided at the chip body 32. The connecting elements 13' of the electronic holder 10' comprises a plurality of chip connectors 131', wherein the photosensitive chip conductive elements 31 are electrically connected with the corresponding chip connectors 131' to achieve the electrical conduction and electrification between the photosensitive chip 30 and the electrical holder 10'. According to the alternative of the first preferred embodiment of the present invention, each of the photosensitive chip conductive elements 31 can be electrically connected with the corresponding chip connector 131' by traditional COB type. In other words, the photosensitive chip 30 is connected with a lead 60 (gold, copper, aluminum and silver wire) by traditional COB type to be electrically connected with the chip connector 131' of the electrical holder 10'. According to the alternative of the first preferred embodiment of the present invention, the chip connector 131' may be embodied as but not be limited to a pin or bonding pad. In other words, the photosensitive chip 30 can be electrically connected with the electrical holder 10' by fully utilizing the existing technology to reduce the cost of the technical improvement, making full use of the traditional process and equipment to minimize the waste of resources. Of course, it is appreciated by one skilled in the art that the electronic connection between the photosensitive chip 30 and the electrical holder 10' can be achieved by any other electronic connection mode, which can accomplish the objects of the present invention. In this aspect, the present invention is not limited.

According to the alternative of the first preferred embodiment of the present invention, the chip connectors 131' are provided at an inner wall of the second supporting portion 112'. The through hole 100' provides enough space for wire configuration and protection for the lead 60.

As shown in FIGS. 4 and 5, the electrical holder 10' is electrically connected with the flexible circuit board 20. Specifically, the connecting elements 13' of the electrical holder 10' further comprise a plurality of board connectors 132'. The flexible circuit board 20 comprises a plurality of PCB conductive elements 21 and a board body 22, wherein the PCB conductive elements 21 are provided at the board body 22. The PCB conductive elements 21 are electrically connected with the corresponding board connectors 132' to electrically connect the flexible circuit board 20 with the electrical holder 10', such that the electrical holder 10' can be electrically connected to a power unit.

According to the alternative of the first preferred embodiment of the present invention, the electrical holder 10' is electrically connected with the flexible circuit board 20 to ensure the flexible circuit board 20 to be securely supported and electrically connected with the electrical holder 10'. It is worth mentioning that the PCB conductive elements 21 are provided on the board body 22 and are located corresponding to the location of the board connectors 132' provided on the electrical holder 10' so as to enable the flexible circuit board 20 to be electrically connected with the circuit arrangement 12'. The PCB conductive elements 21 are electrically connected with the board connectors 132' provided on the electrical holder 10', wherein the electrical connection may be embodied but not be limited to soldering connection.

According to the alternative of the first preferred embodiment of the present invention, each of the board connectors 132' can be embodied as but not be limited to a pin or bonding pad. The electrical holder 10' is electrically connected with the flexible circuit board 20 by soldering. It is appreciated to one skilled in the art that the attaching connection type or soldering connection type are exemplary only and not intended to be limiting the present invention. The connection between the electrical holder 10' and the flexible circuit board 20 may be embodied as but not be limited to soldering structure.

The connecting elements 13' of the electrical holder 10' further comprise a plurality of driver connectors 133' and a plurality of component connectors 134', wherein the driver connectors 133' are provided on the top surface 1111' of the first supporting portion 111'. According to the alternative of the first preferred embodiment of the present invention, each of the driver connectors 133' can be embodied but not be limited to a pin or bonding pad. The driver bonding pad is used for electrically connecting the driver 50 with the circuit arrangement 12' to enable the driver 50 be actuated so as to drive the optical lens 40 such that the camera module is adjusted.

The driver 50 comprises a plurality of driver conductive elements 51 and a driver body 52, wherein the driver conductive elements 51 are provided at the driver body 52. It is worth mentioning that the driver conductive elements 51 are provided on the driver body 52 and are located corresponding to the locations of the driver connectors 133' provided on the electrical holder 10' such that when the driver 50 is provided at the electrical holder 10', the driver 50 can be electrically connected with the circuit arrangement 12' and electrically connected with the flexible circuit board 20. More specifically, the driver conductive elements 51 are electrically connected with the driver connectors 133' of the electrical holder 10', the electrical connection method thereof can be but not be limited to anisotropic conductive paste (ACP), ultrasonic welding, thermal compression welding and reflow soldering.

According to the alternative of the first preferred embodiment of the present invention, the component connectors 134' are provided on the second top surface 1121' of the second supporting portion 112'. The component connectors 134' can be embodied as pins or bonding pads, which can be used for electrically connecting the electric components 80. It is appreciated to one skilled in the art that the electric connection between the electric components 80 and the electrical holder 10' can be embodied but not be limited to soldering method.

The camera module according to the alternative of the first preferred embodiment is manufactured by coupling the photosensitive chip 30 at an inner side of the electrical holder 10', locating the optical lens 40 along the photosensitive path of the photosensitive chip 30, electrically connecting the photosensitive chip 30 with the electrical holder 10', embedding a plurality of electrical elements 121' and a plurality of electrical conductors 122' in the main body 11' of the electrical holder 10' to form the circuit arrangement 12' embedded in the main body 11', and providing the connecting elements 13' on the surface of the main body 11' to facilitate the electric conduction of the camera module. The main body 11' is formed by arranging a resin on a reinforcing steel or copper panel to form the first supporting portion 111', the second supporting portion 112' and the through hole 100' so as to configure the main body 11' with the step-stair structure. The photosensitive chip 30 is provided in the through hole 100' in the inner side of the second supporting portion 112'.

The board connectors 132' are provided on the surface of the main body 11', and the flexible circuit board 20 is provided on the electrical holder 10', wherein the circuit arrangement 12' is connected electrically with the flexible circuit board 20 via the board connectors 132'. The connection method for electrically connecting the flexible circuit board 20 on the electrical holder 10' and for electrically connecting the flexible circuit board 20 with the circuit arrangement 12' is selected from the group consisting of soldering, anisotropic conductive paste, ultra sonic press, UV exposure, X-ray exposure, conductive glue, hot pressing, and etc.

The driver connectors 133' are provided on the surface of the main body 11' and the optical lens 40 is provided on the driver 50 to form a zoom or auto-focus camera module. The driver 50 is provided on the electrical holder 10' by electrically connecting the circuit arrangement 12' with the driver 50 via the driver connectors 133'. The connection method for electrically coupling the driver 50 on the electrical holder 10' and for electrically connecting the driver 50 with the circuit arrangement 12' is selected from the group consisting of soldering, anisotropic conductive paste, ultra sonic press, UV exposure, X-ray exposure, conductive glue, hot pressing, and etc.

The component connectors 134' are provided on the surface of the main body 11', wherein the electronic components 80 are provided on the main body 11' and are electrically connected with the circuit arrangement 12' via the component connectors 134'. The connection method for electrically coupling the electronic components 80 on the electrical holder 10' is preferably by a soldering method.

The photosensitive chip 30 is formed by extending a lead therefrom by the traditional COB, in order to electrically connect with the chip connectors 131' of the electrical holder 10'. Each of the chip connectors 131' can be embodied as but not be limited to a pin or bonding pad. As shown in FIGS. 4 to 5, the chip connectors 131' can be provided on the inner surface of the second supporting portion 112'.

It is worth mentioning that the electrical holder of the present invention can be used for zoom camera modules, auto-focus camera modules or fixed-focus camera modules.

Figure 6:
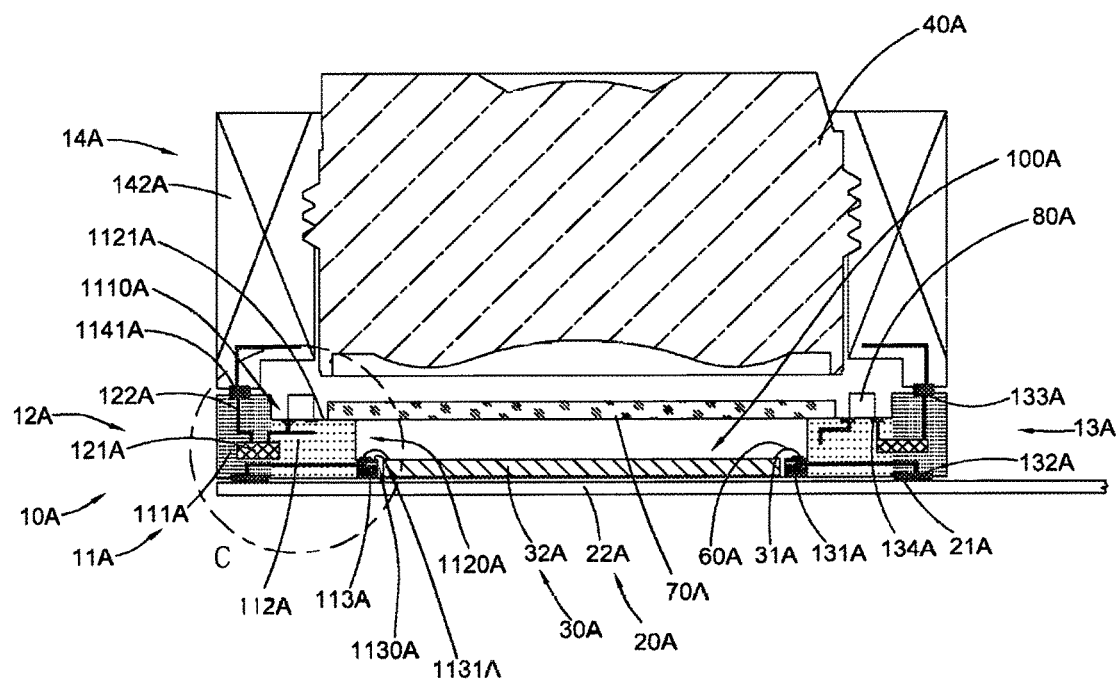
FIG. 6 is a sectional view of a camera module according to the second preferred embodiment of the present invention.
Figure 7:
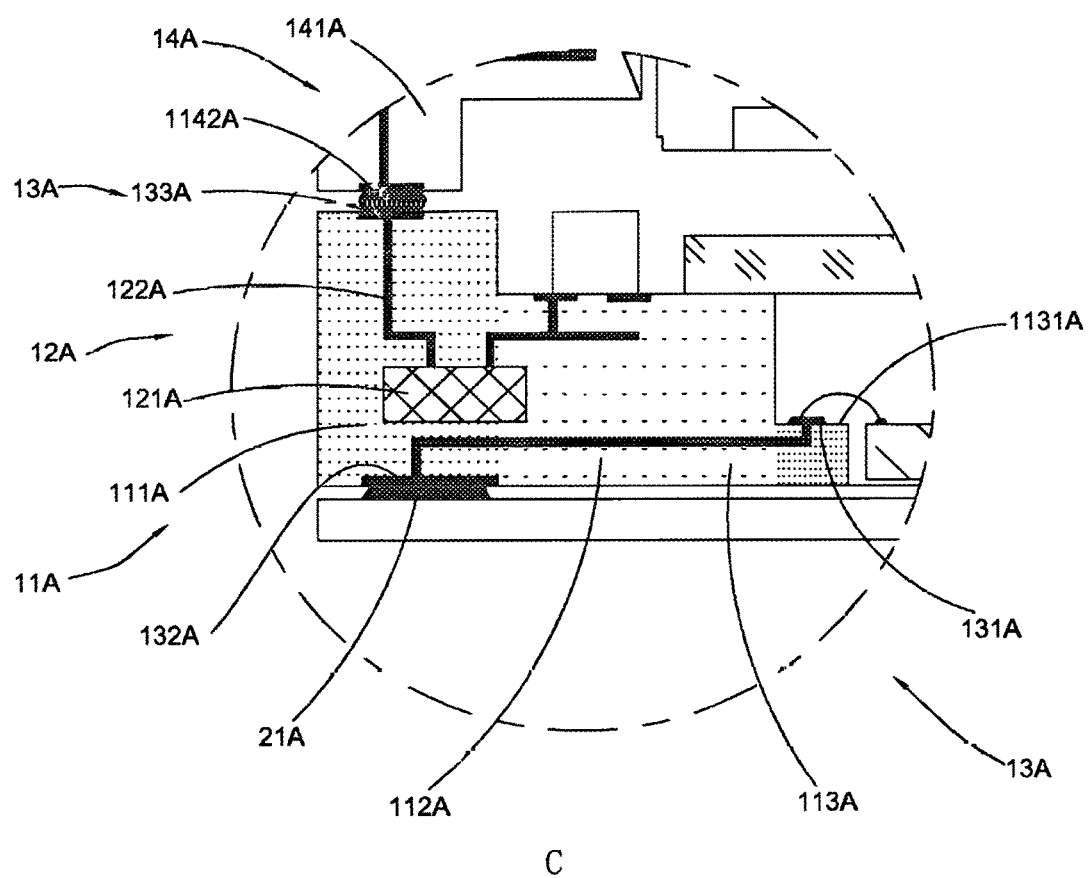
FIG. 7 is a partially enlarged sectional view of the camera module according to the second preferred embodiment of the present invention.

As shown in FIGS. 6 and 7, a camera module according to a second preferred embodiment of the present invention illustrates another alternative mode of the first embodiment. The camera module comprises an electrical holder 10A, a flexible circuit board 20A, a photosensitive chip 30A, an optical lens 40 A. In the second embodiment, the camera module is a fixed-focus camera module that the above mentioned driver is omitted.

The electrical holder 10A comprises a main body 11A, a circuit arrangement 12A, a plurality of connecting elements 13A, and a through hole 100A. The circuit arrangement 12A comprises a plurality of electrical elements 121A and a plurality of electrical conductors 122A, wherein the electrical conductors 122A are electrically connected with the electrical elements 121A in a predetermined manner. In addition, the electrical conductors 122A are electrically connected to the flexible circuit board 20A and the photosensitive chip 30A via the connecting elements 13A, so as to pre-form a camera circuit of the camera module.

The optical lens 40A and the photosensitive chip 30A are provided at two different sides of the electrical holder 10A so as to locate the optical lens 40A along a photosensitive path of the photosensitive chip 30. When the camera module is operated for capturing image, the light reflected by the object can be further accepted by the photosensitive chip 30A for photoelectric conversion after passing through the optical lens 40A. That is to say, the flexible circuit board 20A is connected with the electrical holder 10A. In other words, the electrical holder 10A serves as an integration of a base and a PCB in a conventional camera module, wherein the electrical holder 10A forms an assembling means for connecting the optical lens 40A and forms an electrical connection means for electrically connecting to the photosensitive chip 30A and the flexible circuit board 20A with each other.

As shown in FIGS. 6 and 7, according to the second preferred embodiment of the present invention, the main body 11A comprises a first supporting portion 111A, a second supporting portion 112A and a third supporting portion 113A. It is worth mentioning that the first supporting portion 111A, the second supporting portion 112A and the third supporting portion 113A are integrated with each other. The electrical holder further comprises a lens supporter 14A. The lens supporter 14A can be integrated with the first supporting portion 111A, the second supporting portion 112A or the third supporting portion 113A. Alternatively, the lens supporter 14A can be detachably connected with the first supporting portion 111A, the second supporting portion 112A or the third supporting portion 113A. According to the second preferred embodiment of the present invention, which is illustrated in FIGS. 6 and 7, the lens supporter 14A is integrated with the first supporting portion 111A. In this aspect, the present invention is not limited.

According to the second embodiment of the present invention, the first supporting portion 111A forms an outer annular ring body. The second supporting portion 112A is integrated with an inner side of the first supporting portion 111A, and the third supporting portion 113A is integrated with an inner side of the second supporting portion 112A. Therefore, the second supporting portion 112A forms a middle annular ring body. The third supporting portion 113A forms an inner annular ring body. The first supporting portion 111A has a first top surface 1111A. The second supporting portion 112A has a second top surface 1121A. The third supporting portion 113A has a third top surface 1121A. The second top surface 1121A is inwardly indented corresponding to the first top surface 1111A to define a first indented groove 1110A, and the third supporting portion 113A has a third indented groove 1130A at an inner side thereof. The main body 11A of the electrical holder 10A of the camera module according to the second preferred embodiment has a step-stair configuration such that the main body 11A not only provides a securely supporting structure to support to the lens supporter 14A and the optical lens 40A by the first supporting portion 111A, but also fully utilizes the installation space for other camera components of the camera module. For example, according to the second embodiment of the present invention, the camera module further comprises an optical filter 70A and a plurality of electronic components 80A, wherein the optical filter 70A is used for filtering useless light to improve the image's quality. The optical filter 70A and the electronic components 80A are provided on the second top surface 1121A of the second supporting portion 112A, such that the first indented groove 1110A can provide an arrangement space for the optical filter 70A and the electronic, components 80A.

The photosensitive chip 30A is located corresponding to the through hole 100A. According to the second embodiment of the present invention, the photosensitive chip 30A is provided in the through hole 100A and is enclosed by the third supporting portion 113A to fully utilize the space of the through hole 100A. It is worth mentioning that the setting location of the photosensitive chip 30A is exemplary only and not intended to be limiting the present invention. According to other embodiments of the present invention, the photosensitive chip 30A may be provided at other positions, for example, a top side of the third top surface 1131A of the third supporting portion 113A.

The photosensitive chip 30A is electrically connected to the electrical holder 10A. Specifically, the photosensitive chip 30A comprises a plurality of photosensitive chip conductive elements 31A and a chip body 32A, wherein the photosensitive chip conductive elements 31A are provided at the chip body 32A. The connecting elements 13A of the electrical holder 10A comprises a plurality of chip connectors 131A, wherein the photosensitive chip conductive elements 31A are electrically connected with the corresponding chip connectors 131A to achieve the electrical conduction and electrification between the photosensitive chip 30A and the electrical holder 10A. According to the second embodiment of the present invention, each of the photosensitive chip conductive elements 31A can be electrically connected with the corresponding chip connector 131A by the traditional COB type. In other words, the photosensitive chip 30A is connected with a lead 60A (gold, copper, aluminum and silver wire) by the traditional COB type for electrically connecting with the chip connector 131A of the electrical holder 10A. According to the second embodiment of the present invention, the chip connector 131A may be embodied as but not be limited to a pin or bonding pad. In other words, the photosensitive chip 30A can be electrically connected with the electrical holder 10A by fully utilizing the existing technology to reduce the cost of the technical improvement, making full use of the traditional process and equipment to minimize the waste of resources. Of course, it is appreciated by one skilled in the art that the electrical connection between the photosensitive chip 30A and the electrical holder 10A can be achieved by any other electronic connection mode, which can accomplish the objects of the present invention. In this aspect, the present invention is not limited.

According to the second embodiment of the present invention, the second indented groove 1120A provides enough space of wire configuration and protection for the lead 60 and the third supporting portion 113A ensures the electrical connection of the photosensitive chip 30A and the electrical holder 10A to be more secured.

It is appreciated by one skilled in the art that the structure that the main body 11A comprises the first supporting portion 111A, the second supporting portion 112A and the third supporting portion 113A is exemplary only and not intended to be limiting the present invention. According to other embodiments of the present invention, the main body 11A may be provided to define a double-step shape, multiple-step shape or non-step shape. In this aspect, the present invention should not be limited. During the process that the camera module is designed, the shape of the main body 11A can be adjusted corresponding to the required.

As shown in FIGS. 6 and 7, the electrical holder 10A is electrically connected with the flexible circuit board 20A. Specifically, the connecting elements 13A of the electronic 10A further comprise a plurality of board connectors 132A. The flexible circuit board 20A comprises a plurality of PCB conductive elements 21A and a board body 22A, wherein the PCB conductive elements 21A are provided at the board body 22A. The PCB conductive elements 21A are electrically connected with the corresponding board connectors 132A so as to electrically connect the electrical holder 10A with the flexible circuit board 20A. Therefore, the electrical holder 10A can be electrically connected to a power unit.

According to the second embodiment of the present invention, the electrical holder 10A is coupled to the flexible circuit board 20A to electrically connect the electrical holder 10A with the flexible circuit board 20A. It is worth mentioning that the PCB conductive elements 21A are provided on the board body 22A and located corresponding to the locations of the board connectors 132A provided on the electrical holder 10A so as to enable the flexible circuit board 20A be electrically connected with the circuit arrangement 12A. The PCB conductive elements 21A are electrically connected with the board connectors 132A provided on the electrical holder 10A, wherein the electric connection may be embodied but not be limited to soldering connection.

According to the second embodiment of the present invention, each of the board connectors 132A can be embodied as but not be limited to a pin or bonding pad. The electrical holder 10A is electrically connected with the flexible circuit board 20A by soldering. It is appreciated to one skilled in the art that the attaching connection type or soldering connection type are exemplary only and not intended to be limiting the present invention. The connection between the electrical holder 10' and the flexible circuit board 20 may be embodied as but not be limited to soldering.

The connecting elements 13A of the electrical holder 10A further comprise a plurality of component connectors 134A and a plurality of connecting members 133A, wherein the connecting members 133A are provided on the top surface 1111A of the first supporting portion 111A. According to the second embodiment of the present invention, each of the connecting members 133A can be embodied but not be limited to a pin or bonding pad. It is worth mentioning that not only the first supporting portion 111A, the second supporting portion 112A and the third supporting portion 113A of the main body 11A, but also the lens supporter 14A can be used for an embedded circuit to further improve available space of necessary components so as to minimize the size of the entire camera module. It is appreciated that the lens supporter 14A can also be used in the embedded circuit. A bonding pad of the lens supporter 14A is used for connecting the embedded circuit with the embedded circuits of the first supporting portion 111A, the second supporting portion 112A and the third supporting portion 113A so as to form the circuit arrangement 12A. It is appreciated by one skilled in the art that, in some embodiments that the lens supporter 14A is integrated with the first supporting portion 111A, the second supporting portion 112A or the third supporting portion 113A, wherein the connecting members 133A are omitted.

According to the second embodiment of the present invention, the lens supporter 14A comprises a plurality of supporter circuit connectors 141A and a supporter body 142A, wherein the supporter circuit connectors 141A are provided at the supporter body 142A. It is worth mentioning that the supporter circuit connectors 141A are provided on the supporter body 142A and are located corresponding to the location of the connecting members 133A provided on the electrical holder 10A such that when the lens supporter 14A is coupled at the electrical holder 10A, the lens supporter 14A can be electrically connected with the circuit arrangement 12A and electrically connected with the flexible circuit board 20A. More specifically, the supporter circuit connectors 141A are electrically connected with the connecting members 133A of the electrical holder 10A, wherein the electrical connection method can be but not be limited to anisotropic conductive paste (ACP), ultrasonic welding, thermal compression welding and reflow soldering.

According to the second embodiment of the present invention, the component connectors 134A are provided on the second top surface 1121A of the second supporting portion 112A. The component connectors 134A can be embodied as pins or bonding pads, which can be used for electrically connecting the electric components 80A. It is appreciated to one skilled in the art that the electrical connection between the electric components 80A and the electrical holder 10A can be embodied but not be limited to welding It is worth mentioning that the flexible circuit board 20A and the electrical holder 10A are two individual components, wherein the configurations of the flexible circuit board 20A and the electrical holder 10A are exemplary only but not to be limiting the present invention. According to other embodiments of the present invention, the flexible circuit board 20A may be integrated with the electrical holder 10A. In addition, the shapes of the flexible circuit board 20A and the electrical holder 10A can be configured, respectively or integrally, as required.

The camera module according to the second embodiment is manufactured by coupling the photosensitive chip 30A at an inner side of the electrical holder 10A, locating the optical lens 40A along the photosensitive path of the photosensitive chip 30A, electrically connecting the photosensitive chip 30A with the electrical holder 10A, embedding a plurality of electrical elements 121A and a plurality of electrical conductors 122A in the main body 11A of the electrical holder 10A to form the circuit arrangement 12A embedded in the main body 11A and the lens supporter 14A, and arranging the connecting elements 13A on the surface of the main body 11A to facilitate the electric conduction of the camera module. The main body 11A is formed by arranging a laminate resin on a reinforcing steel or copper panel to form the first supporting portion 111A, the second supporting portion 112A, the third supporting portion 113A and the through hole 100A so as to configure the main body 11A with the step-stair structure. The photosensitive chip 30A is provided in the through hole 100A.

The board connectors 132A is provided on the surface of the main body 11A, and the flexible circuit board 20A is provided on the electrical holder 10A, wherein the circuit arrangement 12A is connected electrically with the flexible circuit board 20A via the board connectors 132A. The connection method for electrically connecting the flexible circuit board 20A on the electrical holder 10A and for electrically connecting the flexible circuit board 20A with the circuit arrangement 12A is selected from the group consisting of soldering, anisotropic conductive paste and hot pressing.

The connecting members 135A are provided on a surface of the main body 11A. The optical lens 40A is provided at the lens supporter 14A to form a fixed-focus camera module. The lens supporter 14A is provided at the main body 11A and electrically connected with the electrical elements 121A and the electrical conductors 122A embedded in the main body 11A by the connecting members 135A. The connection method for coupling the lens supporter 14A at the main body 11A and electrically connecting the electrical elements 121A and the electrical conductors 122A embedded in the main body 11A with the circuit arrangement 12A embedded in the lens supporter 14A is selected from the group including soldering, anisotropic conductive paste, ultra sonic press, UV exposure, X-ray exposure, conductive glue, hot pressing, and etc.

The component connectors 134A are provided on the surface of the main body 11A and the electronic components 80A are provided on the main body 11A, wherein the electronic components 80A are electrically connected with the circuit arrangement 12A by the component connectors 134A. The connection method for electrically coupling the electronic components 80A on the electrical holder 10A is preferably by a soldering method. The electronic components 80A comprise a plurality of resistances, capacitances, transistor, converter, diode, or driver chips.

The photosensitive chip 30A is formed by extending a lead therefrom by traditional COB to electrically connect with the chip connectors 131A of the electrical holder 10A. Each of the chip connectors 131A can be embodied as but not be limited to a pin or bonding pad.

It is appreciated to one skilled in the art that the above connecting elements 13A and the configuration mode thereof is exemplary only but not intend to be limiting the present invention. Any alternative mode accomplishing the object of the present invention should be within the scope of the present invention.

Figure 8:
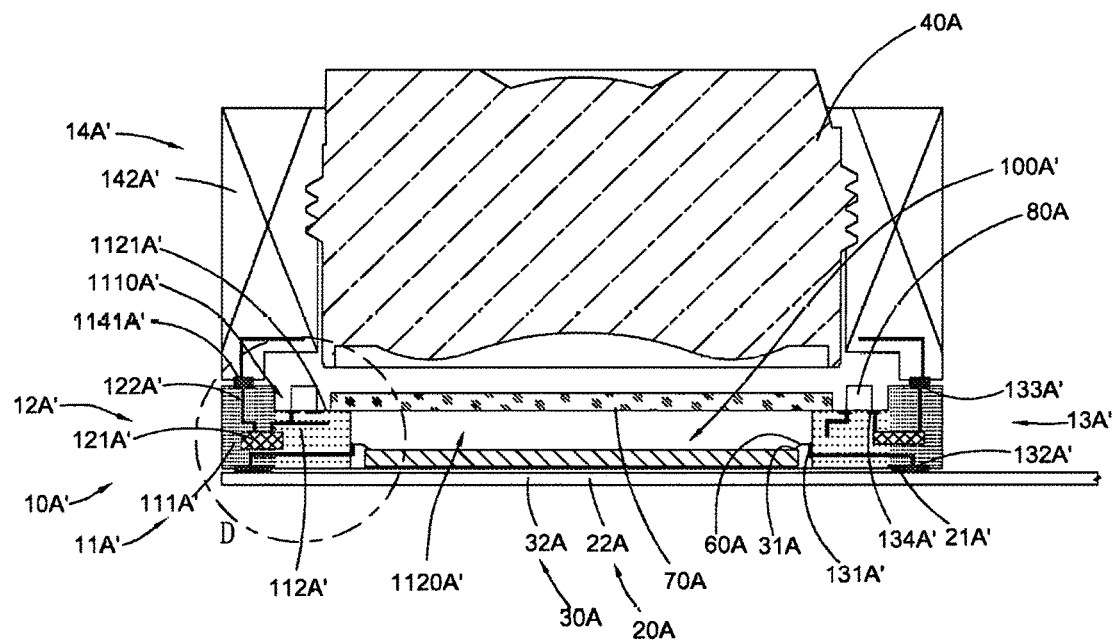
FIG. 8 is a sectional view of an alternative mode of the camera module according to the second preferred embodiment of the present invention.
Figure 9:
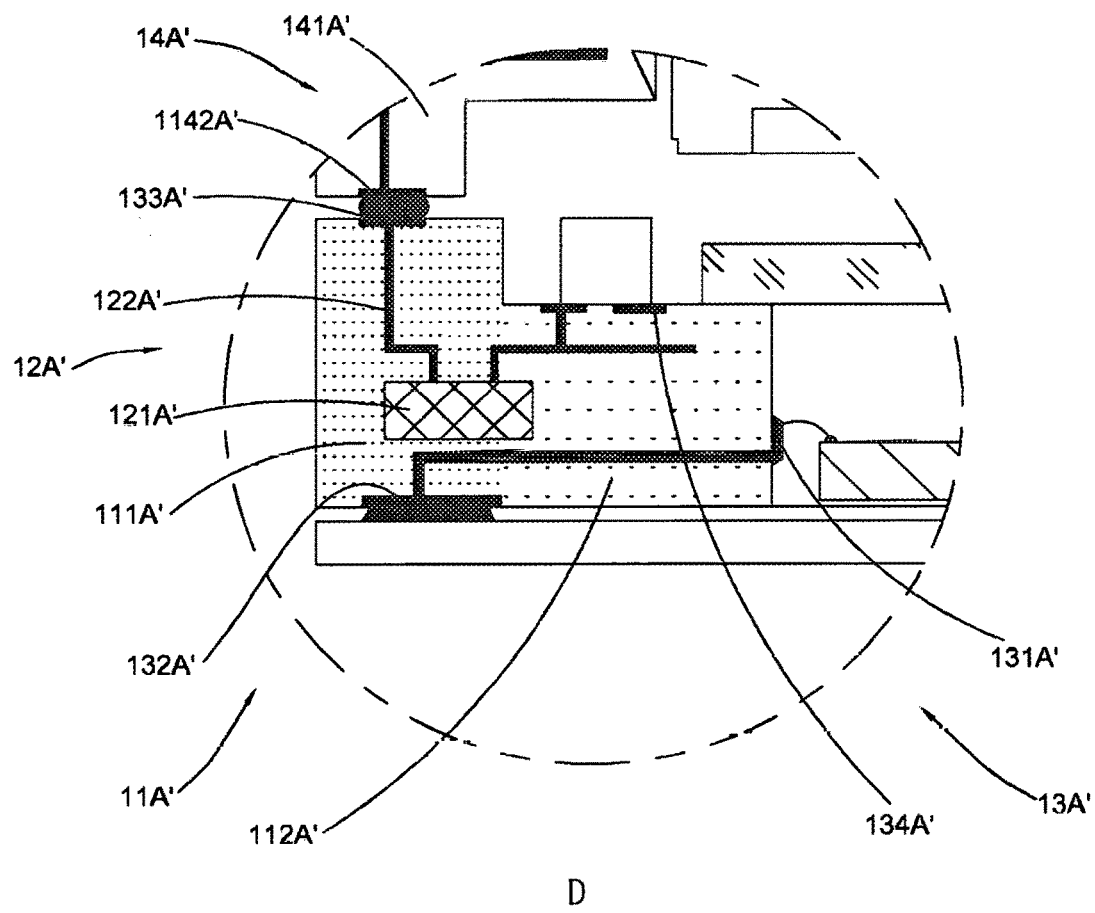
FIG. 9 is a partially enlarged sectional view of the alternative mode of the camera module according to the second preferred embodiment of the present invention.

FIGS. 8 and 9 illustrate an alternative mode of a camera module according to the second preferred embodiment of the present invention. The camera module comprises an electrical holder 10A', a flexible circuit board 20A, a photosensitive chip 30A, and an optical lens 40A.

The electrical holder 10A' comprises a main body 11A', a circuit arrangement 12A', a plurality of connecting elements 13A', and a through hole 100A'. The circuit arrangement 12A' comprises a plurality of electrical elements 121A' and a plurality of electrical conductors 122A', wherein the electrical conductors 122A' are electrically connected with the electrical elements 121A' in a predetermined manner. In addition, the electrical conductors 122A' are electrically connected to the flexible circuit board 20A' and the photosensitive chip 30A' via the connecting elements 13A', so as to pre-form a camera circuit of the camera module.

The optical lens 40A and the photosensitive chip 30A are provided at two different sides of the electrical holder 10A' to locate the optical lens 40A along the photosensitive path of the photosensitive chip 30A. When the camera module is operated for capturing image, the light reflected by the object can be further accepted by the photosensitive chip 30A for photoelectric conversion after passing through the optical lens 40A. That is to say, the flexible circuit board 20A is connected with the electrical holder 10A'. In other words, the electrical holder 10A' serves as an integration of a base and a PCB in a conventional camera module, wherein the electrical holder 10A' forms an assembling means for connecting the optical lens 40A and forms an electrical connection means for electrically connecting the photosensitive chip 20A and the flexible circuit board 20A with each other.

As shown in FIGS. 8 and 9, according to the alternative mode of the second embodiment of the present invention, the main body 11A' comprises a first supporting portion 111A' and a second supporting portion 112A'. It is worth mentioning that the first supporting portion 111A' and the second supporting portion 112A' are integrated with each other. The electrical holder 10A' further comprises a lens supporter 14A'. The lens supporter 14A' may be integrated with the first supporting portion 111A' or the second supporting portion 112A'. Alternatively, the lens supporter 14A' can be detachably connected with the first supporting portion 111A' or the second supporting portion 112A'. According to the alternative mode of the second preferred embodiment of the present invention, which is illustrated in FIGS. 8 and 9, the lens supporter 14A' is integrated with the first supporting portion 111A'. In this aspect, the present invention is not limited.

According to the alternative mode of the second embodiment of the present invention, the first supporting portion 111A' forms an outer annular ring body. The second supporting portion 112A' is integrated with an inner side, of the first supporting portion 111A. The second supporting portion 112A' forms an inner annular ring body. The first supporting portion 111A' has a first top surface 1111A'. The second supporting portion 112A' has a second top surface 1121A'. The second top surface 1121A' is inwardly indented corresponding to the first top surface 1111A' to form a first indented groove 1110A' at an inner side of the first supporting portion 111A' and a bottom side of the second supporting portion 112A', and to form a second indented groove 1120A' at an inner side of the second supporting portion 112A', wherein the first indented groove 1110A' and the second indented groove 1120A' form the through hole 100A'. The main body 11A' of the electrical holder 10A' of the camera module according to the alternative mode of the second preferred embodiment has a step-stair configuration such that the main body 11A' not only securely supporting structure to support the lens supporter 14A' and the optical lens 40' by the first supporting portion 111A', but also fully utilizes the installation space for other camera components of the camera module. For example, according to the alternative of the second embodiment of the present invention, the camera module further comprises an optical filter 70A and a plurality of electronic components 80A, wherein the optical filter 70A is used for filtering useless light to improve the image's quality. The optical filter 70A and the electronic components 80A are provided on the second top surface 1121A' of the second supporting portion 112A' such that the first indented groove 1110A' can provide an arrangement space for the optical filter 70A and the electronic components 80A.

The photosensitive chip 30A is located corresponding to the through hole 100A. According to the alternative mode of the second embodiment of the present invention, the photosensitive chip 30A is provided in the through hole 100A' and is enclosed by the second supporting portion 112A' so as to fully utilize the space of the through hole 100A'.

The photosensitive chip 30A is electrically connected to the electrical holder 10A'. Specifically, the photosensitive chip 30A comprises a plurality of photosensitive chip conductive elements 31A and a chip body 32A, wherein the photosensitive chip conductive elements 31A are provided at the chip body 32A. The connecting elements 13A' of the electrical holder 10A' comprises a plurality of chip connectors 131A', wherein the photosensitive chip conductive elements 31A are electrically connected with the corresponding chip connectors 131A' to achieve the electrical conduction and electrification of the photosensitive chip 30A and the electrical holder 10A'. According to the alternative mode of the second embodiment of the present invention, each of the photosensitive chip conductive elements 31A can be electrically connected with the corresponding chip connector 131A' by the traditional COB type. In other words, the photosensitive chip 30A is connected with a lead 60A (gold, copper, aluminum and silver wire) by the traditional COB type to be connected electrically with the chip connector 131A' of the electrical holder 10A'. According to the alternative mode of the second embodiment of the present invention, the chip connector 131A' may be embodied as but not be limited to a pin or bonding pad. In other words, the photosensitive chip 30A can be electrically connected with the electrical holder 10A' by fully utilizing the existing technology to reduce the cost of the technical improvement, making full use of the traditional process and equipment to minimize a waste of resources. Of course, it is appreciated by one skilled in the art that the electronic connection between the photosensitive chip 30A and the electrical holder 10A' can be achieved by any other electronic connection mode, which can accomplish the objects of the present invention. In this aspect, the present invention is not limited.

According to the alternative mode of the second embodiment of the present invention, the photosensitive chip connector 131A' is provided at an inner wall of the second supporting portion 1120A'. The through hole 100' provides enough space of wire configuration and protection for the lead 60A.

As shown in FIGS. 8 and 9, the electrical holder 10A' is electrically connected with the flexible circuit board 20A. Specifically, the connecting elements 13A' of the electrical holder 10A' further comprise a plurality of board connectors 132A'. The flexible circuit board 20A comprises a plurality of PCB conductive elements 21A' and a board body 22A, wherein the PCB conductive elements 21A' are provided at the board body 22A. The PCB conductive elements 21A' are electrically connected with the corresponding board connectors 132A' to electrically connect the electrical holder 10A' with the flexible circuit board 20A, such that the electrical holder 10A' can be electrically connected to a power unit.

According to the alternative mode of the second embodiment of the present invention, the electrical holder 10A' is electrically connected with the flexible circuit board 20A to ensure the flexible circuit board 20A to be securely supported and electrically connected with the electrical holder 10A'. It is worth mentioning that the PCB conductive elements 21A' are provided on the board body 22A and are located corresponding to the locations of the board connectors 132A' provided on the electrical holder 10A' so as to enable the flexible circuit board 20A to be electrically connected with the circuit arrangement 12A'. The PCB conductive elements 21A' are electrically connected with the board connectors 132A' provided on the electrical holder 10A', wherein the electrical connection may be embodied but not be limited to soldering connection.

According to the alternative mode of the second embodiment of the present invention, each of the board connectors 132A' can be embodied as but not be limited to a pin or bonding pad. The electrical holder 10A' is electrically connected with the flexible circuit board 20A by soldering. It is appreciated to one skilled in the art that the attaching connection type or soldering connection type are exemplary only and not intended to be limited in the present invention. The connection between the electrical holder 10' and the flexible circuit board 20 may be embodied as but not be limited to soldering structure.

The connecting elements 13A' of the electrical holder 10A' further comprise a plurality of component connectors 134A' and a plurality of connecting members 133A', wherein the connecting members 133A' are provided on the top surface 1111A' of the first supporting portion 111A'. According to the alternative mode of the second embodiment of the present invention, each of the connecting members 133A' can be embodied but not be limited to a pin or bonding pad. It is worth mentioning that not only the first supporting portion 111A' and the second supporting portion 112A of the main body 11A', but also the lens supporter 14A' can be used for an embedded circuit to further improve available space of necessary components so as to minimize the size of the entire camera module. Of course, the lens supporter 14A' can also be used in the embedded circuit. A bonding pad of the lens supporter 14A' is used for connecting the embedded circuit with the embedded circuits of the first supporting portion 111A' and the second supporting portion 112A' so as to form the circuit arrangement 12A'. It is appreciated by one skilled in the art that, in some embodiments that the lens supporter 14A' is integrated with the first supporting portion 111A' or the second supporting portion 112A', wherein the connecting members 133A' are omitted.

According to the alternative mode of the second embodiment of the present invention, the lens supporter 14A' comprises a plurality of supporter circuit connectors 1141A' and a supporter body 142A', wherein the supporter circuit connectors 1141A' are provided at the supporter body 142A'. It is worth mentioning that the supporter circuit connectors 1141A' are provided on the supporter body 142A' and are located corresponding to the locations of the connecting members 133A' provided on the electrical holder 10A' such that when the lens supporter 14A' is provided at the electrical holder 10A', the lens supporter 14A' can be electrically connected with the circuit arrangement 12A' and electrically connected with the flexible circuit board 20A. More specifically, the supporter circuit connectors 1141A' are electrically connected with the connecting members 133A' of the electrical holder 10A', wherein the electric connection method can be, but not be limited to, anisotropic conductive paste (ACP), ultrasonic welding, thermal compression welding and reflow soldering.

According to the alternative mode of the second embodiment of the present invention, the component connectors 134A' are provided on the second top surface 1121A' of the second supporting portion 112A'. The component connectors 134A' can be embodied as pins or bonding pads, which can be used for electrically connecting the electric components 80A. It is appreciated to one skilled in the art that the electric connection between the electric components 80A and the electrical holder 10A' can be embodied, but not be limited, to soldering method.

The camera module according to the alternative mode of second embodiment is manufactured by coupling the photosensitive chip 30A at an inner side of the electrical holder 10A', locating the optical lens 40A along the photosensitive path of the photosensitive chip 30A, electrically connecting the photosensitive chip 30A with the electrical holder 10A', embedding a plurality of electrical elements 121A' and a plurality of electrical conductors 122A' in the main body 11A' of the electrical holder 10A' to form the circuit arrangement 12A' embedded in the main body 11A' and the lens supporter 14A', and arranging the connecting elements 13A' on the surface of the main body 11A' to facilitate the electric conduction of the camera module. The main body 11A' is formed by arranging resin on a reinforcing steel or copper panel to form the first supporting portion 111A', the second supporting portion 112A' and the through hole 100A' so as to configure the main body 11A' with the step-stair structure. The photosensitive chip 30A is provided in the through hole 100A' and is electrically connected at an inner side of the second supporting portion 112A'.

The board connectors 132A' are provided on the surface of the main body 11A', and the flexible circuit board 20A is provided on the electrical holder 10A', wherein the circuit arrangement 12A' is electrically connected with the flexible circuit board 20A by the board connectors 132A'. The connection method for electrically connecting the flexible circuit board 20A on the electrical holder 10A' and for electrically connecting the flexible circuit board 20A be connected with the circuit arrangement 12A' is selected from the group including soldering, anisotropic conductive paste, ultra sonic press, UV exposure, X-ray exposure, conductive glue, hot pressing, and etc.

The connecting members 135A' are provided on a surface of the main body 11A'. The optical lens 40A is provided at the lens supporter 14A' to form a fixed-focus camera module. The lens supporter 14A' is provided at the main body 11A' and electrically connected with the electrical elements 121A' and the electrical conductors 122A' embedded in the main body 11A' by the connecting members 133A'. The connection method for coupling the lens supporter 14A' at the main body 11A' and electrically connecting the electrical elements 121A' and the electrical conductors 122A' embedded in the main body 11A' with the circuit arrangement 12A' embedded in the lens supporter 14A' is selected from the group including soldering, anisotropic conductive paste, ultra sonic press, UV exposure, X-ray exposure, conductive glue, hot pressing, and etc.

The component connectors 134A' are provided on the surface of the main body 11A' and the electronic components 80A are provided on the main body 11A', wherein the electronic components 80A are electrically connected with the circuit arrangement 12A' by the component connectors 134A'. The connection method for electrically coupling the electronic components 80A on the electrical holder 10A' is preferably, but not limited, by a soldering method.

The photosensitive chip 30A is formed by extending a lead therefrom by the traditional COB type, in order to electrically connect with the chip connectors 131A' of the electrical holder 10A'. Each of the chip connectors 131A' can be embodied as but not be limited to a pin or bonding pad.

Figure 10:
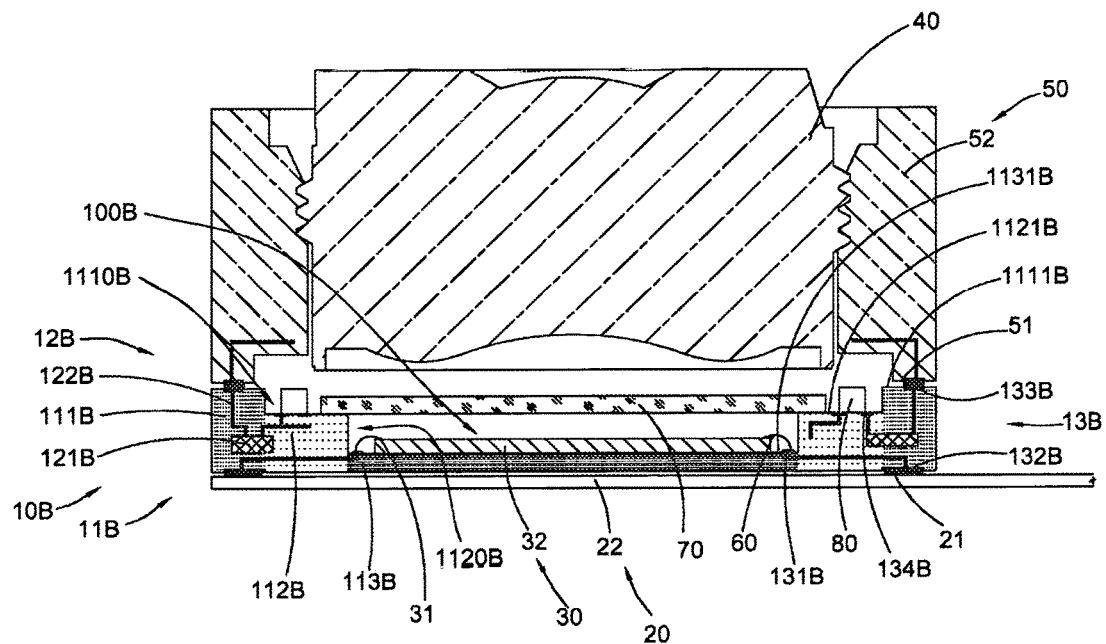
FIG. 10 is a sectional view of a camera module according to the third preferred embodiment of the present invention.

FIG. 10 illustrates a camera module according to a third preferred embodiment of the present invention, wherein the camera module of the third preferred embodiment has the same structural configuration as the camera module of the first preferred embodiment, except the electrical holder 10B. As shown in FIG. 10, the electrical holder 10B comprises a main body 11B, a circuit arrangement 12B, and a plurality of connecting elements 13B. The difference between the electrical holder 10B of the third embodiment and the electrical holder 10 of the first embodiment is that there is no through hole formed at the electrical holder 10B of the third embodiment. In other words, the electrical holder of the present invention can be configured to have no through hole penetrating through the electrical holder. The circuit arrangement 12B comprises a plurality of electrical elements 121B and a plurality of electrical conductors 122B, wherein the electrical conductors 122B are electrically connected with the electrical elements 121B in a predetermined manner. In addition, the electrical conductors 122B are electrically connected to the flexible circuit board 20 and the photosensitive chip 30 via the connecting elements 13B, so as to pre-form a camera circuit of the camera module.

As shown in FIG. 10, according to the third embodiment of the present invention, the main body 11B comprises a first supporting portion 111B, a second supporting portion 112B and a third supporting portion 113B. It is worth mentioning that the first supporting portion 111B, the second supporting portion 112B and the third supporting portion 113B are integrated with each other.

According to the third embodiment of the present invention, the first supporting portion 111B forms an outer annular ring body. The second supporting portion 112B is integrated with an inner side of the first supporting portion 111B, wherein the third supporting portion 113B is integrated with an inner side of the second supporting portion 112B such that the second supporting portion 112B forms a middle annular ring body. The third supporting portion 113B forms a base. The first supporting portion 111B has a first top surface 1111B. The second supporting portion 112B has a second top surface 1121B. The third supporting portion 113B has a third top surface 1131B. The second top surface 1121B is inwardly indented corresponding to the first top surface 1111B to define a first indented groove 1110B. The third top surface 1131B is inwardly indented corresponding to the second top surface 1121B to define a second indented groove 1120B provided on the inner side of the second supporting portion 112, wherein the first indented groove 1110B and the second indented groove 1120B to form an integrated groove 100B, and the integrated groove 100B does not penetrate through the electrical holder 10B. The bottom side of the third supporting portion 113B seals the integrated groove 100B and forms a bottom side thereof. The main body 11B of the electrical holder 10B of the camera module according to the third embodiment has a step-stair configuration such that the main body 11B not only provides a securely supporting structure to support the driver 50 and the optical lens 40 by the first supporting portion 111B, but also fully utilizes the installation space for other camera components of the camera module. For example, according to the third embodiment, the camera module further comprises an optical filter 70 and a plurality of electronic components 80, wherein the optical filter 70 is used for filtering useless light to improve the image's quality. The optical filter 70 and the electronic components 80 are provided on the second top surface 1121B of the second supporting portion 112B such that the first concave groove 1110B can supply arrangement space for the optical filter 70 and the electronic components 80.

As shown in FIG. 10, the photosensitive chip 30 is provided on a top surface of the third supporting portion 113B. The photosensitive chip 30 is electrically connected to the circuit arrangement 12B of the electrical holder 10B. Specifically, the photosensitive chip 30 comprises a plurality of photosensitive chip conductive elements 31 and a chip body 32, wherein the photosensitive chip conductive elements 31 are provided at the chip body 32. The connecting elements 13B of the electronic 10B comprises a plurality of chip connectors 131B, wherein the photosensitive chip conductive elements 31 are electrically connected with the corresponding chip connectors 131B to achieve the electrical conduction and electrification of the photosensitive chip 30 and the electrical holder 10B. According to the third preferred embodiment of the present invention, each of the photosensitive chip conductive elements 31 can be electrically connected with the corresponding chip connector 131B by traditional COB type. In other words, the photosensitive chip 30 is connected with a lead 60 (gold, copper, aluminum and silver wire) by traditional COB type to be electrically connected with the chip connector 131B of the electrical holder 10B. According to the third embodiment of the present invention, each of the chip connectors 131B may be embodied as but not be limited to a pin or bonding pad. The second indented groove 1120B provides enough space for wire configuration and protection for the lead 60, and the third supporting portion 113B ensures the electrical connection of the photosensitive chip 30 and the electrical holder 10B to be more secured. It is appreciated that the photosensitive chip connector 131B can be provided on the top surface of the third supporting portion 113B and can also be provided on an inner surface of the second supporting portion 112B.

As shown in FIG. 10, the electrical holder 10B is electrically connected with the flexible circuit board 20. Specifically, the connecting elements 13B of the electrical holder 10B further comprise a plurality of board connectors 132B. The flexible circuit board 20 comprises a plurality of PCB conductive elements 21 and a board body 22, wherein the PCB conductive elements 21 are provided at the board body 22. The PCB conductive elements 21 are electrically connected with the corresponding board connectors 132B to ensure the electrical holder 10B to be electrically connected with the flexible circuit board 20, such that the electrical holder 10B can be electrically connected to a power unit.

According to the third embodiment of the present invention, the electrical holder 10B is coupled to the flexible circuit board 20 to electrically connect the electrical holder 10B with the flexible circuit board 20. It is worth mentioning that the PCB conductive elements 21 are provided on the board body 22 and are located corresponding to the locations of the board connectors 132B provided on the electrical holder 10B so as to enable the flexible circuit board 20 be electrically connected with the circuit arrangement 12B. The PCB conductive elements 21 are electrically connected with the board connectors 132B provided on the electrical holder 10B, wherein the electrical connection may be embodied but not be limited to soldering connection.

According to the third embodiment of the present invention, each of the board connectors 132B can be embodied as but not be limited to a pin or bonding pad. The electrical holder 10B is electrically connected with the flexible circuit board 20 by soldering. It is appreciated to one skilled in the art that the attaching connection type or soldering connection type are exemplary only and not intended to be limiting the present invention. The connection between the electrical holder 10B and the flexible circuit board 20 may be embodied as but not be limited to soldering structure.

The connecting elements 13B of the electronic 10B further comprise a plurality of driver connectors 133B and a plurality of component connectors 134B, wherein the driver connectors 133B are provided on the top surface 1111B of the first supporting portion 111B. According to the third embodiment of the present invention, each of the driver connectors 133B can be embodied but not be limited to a pin or bonding pad. The driver connectors 133B are used for electrically connecting the driver 50 with the circuit arrangement 12B embedded in the first supporting portion 111B, the second supporting portion 112B and the third supporting portion 113B. It is worth mentioning that the first supporting portion 111B, the second supporting portion 112B and the third supporting portion 113B of the main body 11B can be used for an embedded circuit to further improve available space of necessary components so as to minimize the size of the entire camera module.

According to the third preferred embodiment of the present invention, the driver 50 comprises a plurality of driver conductive elements 51 and a driver body 52, wherein the driver conductive elements 51 are provided at the driver body 52. It is worth mentioning that the driver conductive elements 51 are provided on the driver body 52 and are located corresponding to the locations of the driver connectors 133B provided on the electrical holder 10B such that when the driver 50 is provided at the electrical holder 10B, the driver 50 can be electrically connected with the circuit arrangement 12B. More specifically, the driver conductive elements 51 are electrically connected with the driver connectors 133B of the electrical holder 10B, wherein the electrical connection method can be but not be limited to anisotropic conductive paste (ACP), ultrasonic welding, thermal compression soldering and reflow soldering. It is appreciated that the structure of this embodiment can also be used for a fixed-focus camera module without the driver 50.

According to the third embodiment of the present invention, the component connectors 134B are provided on the second top surface 1121B of the second supporting portion 112B. The component connectors 134B can be embodied as pins or bonding pads, which can be used for electrically connecting the electronic components 80. It is appreciated to one skilled in the art that the electrical connection between the electronic components 80 and the electrical holder 10B can be embodied but not be limited to soldering.

It is worth mentioning that the electrical holder 10B, according to the third embodiment of the present invention, does not have the through hole. In other word, the third supporting portion 113B provided in the middle portion of the main body 11B is configured to have no through hole. So, the third supporting portion 113B can be used for configuring circuits, for example, of the electrical elements 121B and the electrical conductors 122B of the circuit arrangement 12B. In this way, when the circuit arrangement 12B is configured, no wire is needed to pass through the through hole, such that the circuit arrangement 12B can be directly configured at the third supporting portion 113B, which improves the available space for configuring the circuit arrangement 12B and prevents any unusable space at the through hole to prolong the distance of the circuit connection. At the same time, it also helps to decrease the overall dimension of the electrical holder 10B for minimizing the size of the corresponding camera module so as to make it have a good prospect of application in electronic equipments.

The camera module according to the third embodiment is manufactured by coupling the photosensitive chip 30B at an inner side of the electrical holder 10B, locating the optical lens 40B in the photosensitive path of the photosensitive chip 30B, electrically connecting the photosensitive chip 30B with the electrical holder 10B, embedding a plurality of electrical elements 121B and a plurality of electrical conductors 122B in the main body 11B of the electrical holder 10B to form the circuit arrangement 12B embedded in the main body 11B and the lens supporter 14B, and arrange the connecting elements 13B on the surface of the main body 11B to facilitate the electric conduction of the camera module. The main body 11B is formed by arranging a laminate resin on a reinforcing steel or copper panel to form the first supporting portion 111B, the second supporting portion 112B and the third supporting portion 113B so as to configure the main body 11B with the step-stair structure. The photosensitive chip 30B is provided at the top surface of the third supporting portion 113B.

The board connectors 132B are provided on the surface of the main body 11B, and the flexible circuit board 20 is provided on the electrical holder 10B, wherein the circuit arrangement 12B is electrically connected with the flexible circuit board 20B by the board connectors 132B. The connection method for electrically connecting the flexible circuit board 20 on the electrical holder 10B and for electrically connecting the flexible circuit board 20 with the circuit arrangement 12B is selected from the group including welding, anisotropic conductive paste, ultra sonic press, UV exposure, X-ray exposure, conductive glue, hot pressing, and etc.

The driver connectors 133B are provided on the surface of the main body 11B, and the optical lens 40 is provided on the driver 50 to form a zoom camera module. The driver 50 is provided on the electrical holder 10B, and the circuit arrangement 12B is electrically connected with the driver 50 by the driver connectors 133B. The connection method for electrically connecting the driver 50 on the electrical holder 10B and for electrically connecting the driver 50 with the circuit arrangement 12B is selected from the group including welding, anisotropic conductive paste, ultra sonic press, UV exposure, X-ray exposure, conductive glue, hot pressing, and etc.

The component connectors 134B are provided on the surface of the main body 11B, and the electronic components 80 are provided on the main body 11B, wherein the electronic components 80 are electrically connected with the circuit arrangement 12B by the component connectors 134B. The connection method for electrically coupling the electronic components 80 on the electrical holder 10B is preferably embodied but not limited by a soldering method. The electronic components 80 can be resistances, capacitances, transistor, converter, diode, or driver chips.

The photosensitive chip 30 is formed by extending a lead therefrom by the traditional COB type, to be connected electrically with the chip connectors 131B of the electrical holder 10B. Each of the chip connectors 131B can be embodied as but not be limited to a pin or bonding pad.

FIG. 11 illustrates an electrical conduction method for the camera module of the present invention. As shown in FIG. 11, the electrical conduction method for the camera module comprises the steps of:

S1: arranging a plurality of electrical elements 121 and a plurality of electrical conductors 122 electrically connected with the electrical elements 121 at the main body 11 of the electrical holder 10, wherein the electrical elements 121 and the electrical conductors 122 are connected to form the circuit arrangement 12;

S2: electrically connecting the photosensitive chip 30 at the electrical holder 10; and S3: electrically connecting a flexible circuit board 20 with the electrical holder 10.

The electrical conduction method for the camera module of the present invention further comprises the steps of:

S4: electrically connecting the driver 50 with the electrical holder 10; and

S5: electrically connecting the camera module with an electronic equipment by the flexible circuit board 20 to input control signals therein.

By the above aspects, the components of the camera module of the present invention are electrically connected with each other to make the camera module have a predetermined function.

It is worth mentioning that the step S1 can be embodied as embedding the electrical elements 121 and the electrical conductors 122 in the electrical holder 10.

According to the embodiment, in the step S2, the connection method for connecting electrically the photosensitive chip 30 with the electrical holder 10 is selected from the group including soldering, anisotropic conductive paste, ultra sonic press, UV exposure, X-ray exposure, conductive glue, hot pressing, and etc. In the step S3, the connection method for connecting electrically the flexible circuit board 20 with the electrical holder 10 is selected from the group including soldering, anisotropic conductive paste, ultra sonic press, UV exposure, X-ray exposure, conductive glue, hot pressing, and etc. In the step S4, the connection method for connecting electrically the driver 50 with the electrical holder 10 is selected from the group including soldering, anisotropic conductive paste, ultra sonic press, UV exposure, X-ray exposure, conductive glue, hot pressing, and etc.

It is worth mentioning that the steps S2, S3 and S4 of the above electrical conduction method for the camera module are not arranged in any special order, which can be adjusted in a specific manufacturing process. In addition, when the driver 50 is no longer needed, the step S4 can be omitted.

On the entire structure, the camera module of the present invention has the following advantages different from the traditional COB camera module:

(1) the photosensitive chip and the electrical holder can be electrically connected with each other;

(2) the electrical holder enables capacitances, resistances, transistor, converter, diode and/or driver chips be embedded therein;

(3) the electrical holder can be configured to have a step-stair configuration to enable the wire to be extended to connect with the chip, wherein the wire is not limited to a gold, aluminum, copper or silver wire;

(4) the electrical holder can be configured to have a step-stair configuration to support the optical filter; and (5) the electrical holder can be configured to construct with a bonding pad provided on the bottom of the electrical holder, which is electrically communicated with the flexible circuit board, wherein the method is not limited to soldering or anisotropic conductive paste or the like.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An electrical holder for at least a camera module which comprises a photosensitive chip, comprising:
    a main body, wherein said main body comprises a first supporting portion, a second supporting portion and a third supporting portion, wherein said third supporting portion is inwardly indented corresponding to said second supporting portion, wherein an inner side of said first supporting portion and a top side of said second supporting portion form a first indented groove, a top side of said third supporting portion has a second indented groove, and an inner side of said third supporting portion has a third indented groove, wherein said first indented groove, said second indented groove and said third indented groove form a through hole; and
    a circuit arrangement integrated within said main body, wherein said main body is arranged for supporting the photosensitive chip therein, wherein said circuit arrangement is arranged for electrically connecting to the photosensitive chip.

2. An electrical holder for at least a camera module which comprises a photosensitive chip, comprising:
    a main body, wherein said main body comprises a first supporting portion, a second supporting portion and a third supporting portion, wherein an inner side of said first supporting portion and a top side of said second supporting portion form a first indented groove, a top side of said third supporting portion has a second indented groove, wherein said first indented groove and said second indented groove form an integrated groove, wherein said third supporting portion forms a base and has a bottom serving as a bottom of said integrated groove; and
    a circuit arrangement integrated within said main body, wherein said main body is arranged for supporting the photosensitive chip therein, wherein said circuit arrangement is arranged for electrically connecting to the photosensitive chip.

3. The electrical holder, as recited in claim 2, further comprising a plurality of chip connectors for electrically connecting with the camera module, wherein said chip connectors are provided on the top side of said third supporting portion.

* * * * *